(12) United States Patent
Tsuwano et al.

(10) Patent No.: US 10,841,456 B2
(45) Date of Patent: Nov. 17, 2020

(54) INFORMATION PROCESSING APPARATUS, INFORMATION PROCESSING METHOD, AND NON-TRANSITORY RECORDING MEDIUM

(71) Applicant: RICOH COMPANY, Ltd., Ohta-Ku (JP)

(72) Inventors: Fumiko Tsuwano, Tokyo (JP); Hiroki Yamamoto, Tokyo (JP); Hideaki Fujiwara, Tokyo (JP); Yoshikazu Itoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 259 days.

(21) Appl. No.: 15/982,399

(22) Filed: May 17, 2018

(65) Prior Publication Data
US 2018/0338066 A1    Nov. 22, 2018

(30) Foreign Application Priority Data

May 22, 2017   (JP) ................................. 2017-100868

(51) Int. Cl.
| | |
|---|---|
| *G06T 7/00* | (2017.01) |
| *H04N 1/40* | (2006.01) |
| *G06T 11/00* | (2006.01) |
| *G06T 7/10* | (2017.01) |
| *H04N 1/387* | (2006.01) |
| *G06T 11/60* | (2006.01) |

(52) U.S. Cl.
CPC ........... *H04N 1/40068* (2013.01); *G06T 7/10* (2017.01); *G06T 11/001* (2013.01); *G06T 11/60* (2013.01); *H04N 1/387* (2013.01); *H04N 1/40093* (2013.01); *G06T 2200/24* (2013.01)

(58) Field of Classification Search
CPC ............... H04N 1/40068; H04N 1/387; H04N 1/40093; G06T 7/10; G06T 11/001; G06T 11/60; G06T 2200/24
See application file for complete search history.

(56) References Cited

U.S. PATENT DOCUMENTS

| | | | | | |
|---|---|---|---|---|---|
| 5,737,503 | A | * | 4/1998 | Mitani .................... | G06K 15/02 358/1.16 |
| 5,751,924 | A | * | 5/1998 | Hamada ................. | G06F 3/1297 358/1.16 |
| 2007/0176944 | A1 | * | 8/2007 | Brown ................... | G06F 3/0481 345/592 |

(Continued)

FOREIGN PATENT DOCUMENTS

| | | |
|---|---|---|
| JP | 2014-089084 | 5/2014 |
| JP | 2015-095123 | 5/2015 |
| JP | 2017-058720 | 3/2017 |

*Primary Examiner* — Sean T Motsinger
(74) *Attorney, Agent, or Firm* — Xsensus LLP

(57) ABSTRACT

An information processing apparatus includes circuitry to designate an attribute of an image object to be superimposed with an additional object and perform first identification to identify an image object indicating the attribute designated, among image objects included in image data. The circuitry performs second identification to identify an image object that has not yet been superimposed with an additional object, among image objects identified by the first identification, and generates the additional object to be superimposed on the image object identified by the second identification.

17 Claims, 15 Drawing Sheets

(56) References Cited

U.S. PATENT DOCUMENTS

| | | | |
|---|---|---|---|
| 2008/0122868 A1* | 5/2008 | Mizutani | G06T 11/60 345/629 |
| 2009/0092336 A1* | 4/2009 | Tsurumi | G06K 9/3216 382/294 |
| 2009/0169277 A1* | 7/2009 | Fowlkes | G03G 15/5025 399/341 |
| 2010/0008600 A1* | 1/2010 | Kamijo | G06K 9/2054 382/313 |
| 2013/0070307 A1* | 3/2013 | Barnoy | B41J 2/2114 358/3.29 |
| 2013/0271791 A1* | 10/2013 | Miyazaki | G06F 3/1285 358/2.1 |
| 2015/0124295 A1* | 5/2015 | Yamane | G06T 11/60 358/2.1 |
| 2015/0131113 A1* | 5/2015 | Tsuwano | G06T 11/60 358/1.9 |
| 2015/0131127 A1* | 5/2015 | Yamamoto | G06K 15/188 358/2.1 |
| 2015/0371101 A1* | 12/2015 | Yamamoto | G06T 11/60 715/771 |
| 2017/0076478 A1* | 3/2017 | Yamamoto | H04N 1/54 |
| 2018/0012388 A1 | 1/2018 | Yamamoto et al. | |
| 2018/0024699 A1 | 1/2018 | Shimizu et al. | |
| 2018/0338066 A1* | 11/2018 | Tsuwano | H04N 1/40068 |

\* cited by examiner

| FIRST LAYER | SECOND LAYER | THIRD LAYER | COMMENTS |
|---|---|---|---|
| root | | | NO ATTRIBUTE (TAG INDICATING ROOT) |
| | settingName | | SETTING NAME TAG |
| | | targetObjType | DESIGNATED OBJECT-TYPE TAG |
| | | Special color | SPECIAL-COLOR TAG |
| | | tintValue | DENSITY TAG |
| | | targetPages | TARGET-PAGE COUNT TAG |

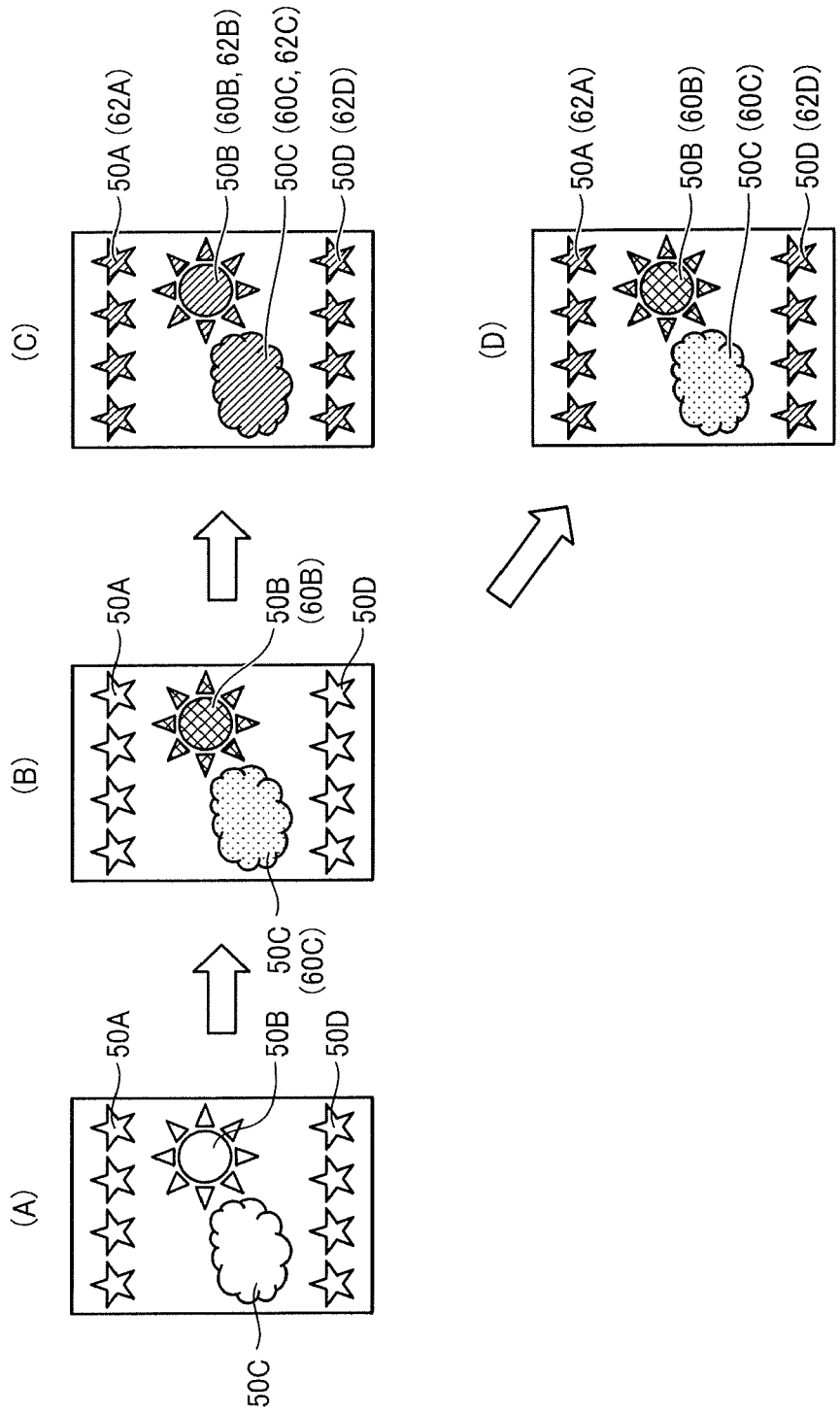

FIG. 11A

| ADDITIONAL MANAGEMENT INFORMATION | | |
|---|---|---|
| APPLICATION ID | ADDITIONAL FLAG INFORMATION | COMMON IDENTIFICATION INFORMATION |
| SCE | 1 | 0001 |

FIG. 11B

| IMAGE MANAGEMENT INFORMATION | | |
|---|---|---|
| APPLICATION ID | IMAGE FLAG INFORMATION | COMMON IDENTIFICATION INFORMATION |
| SCE | 0 | 0001 |

FIG. 11C

MANAGEMENT TABLE

| COMMON IDENTIFICATION INFORMATION |
|---|
| 0001 |
| 0002 |
| 0003 |
| ⋮ |

← 15B

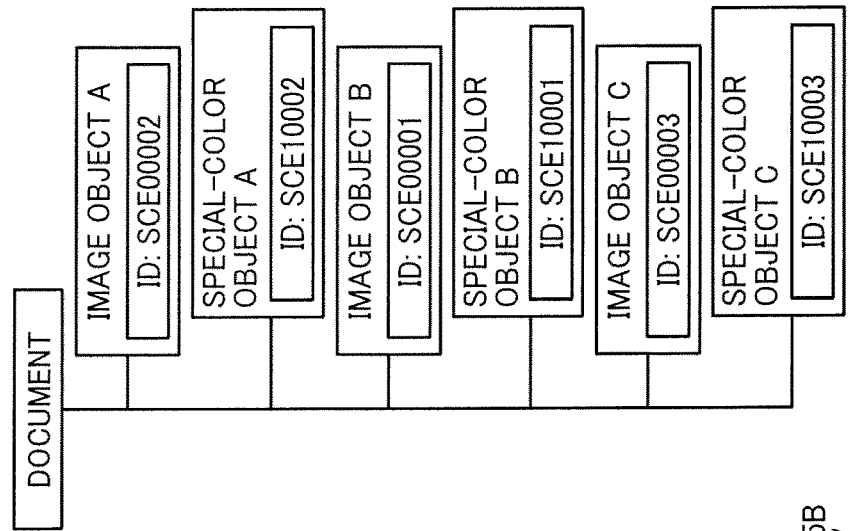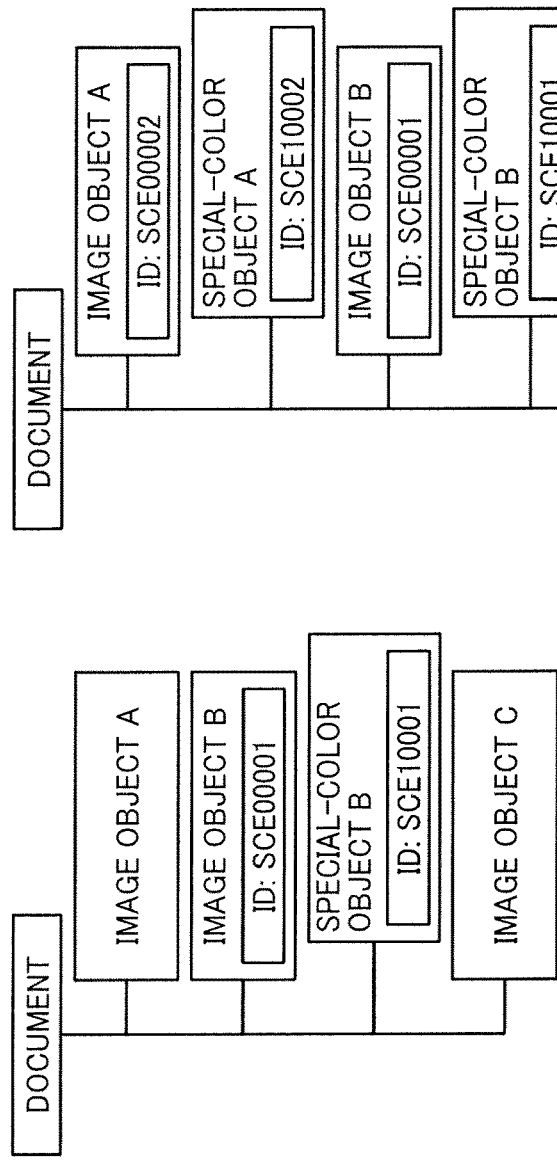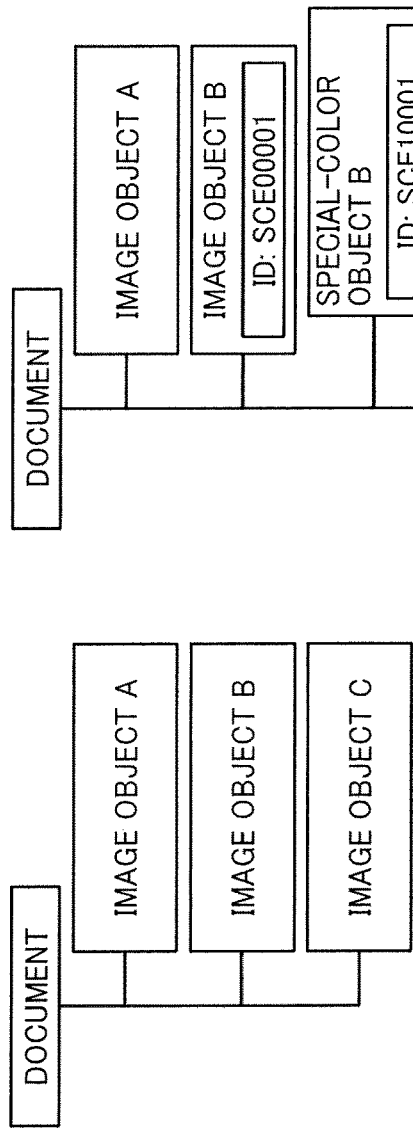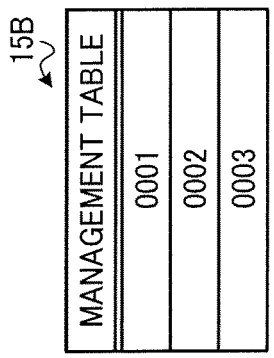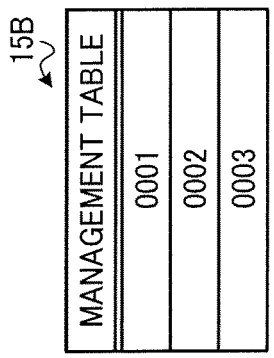

FIG. 13

MANAGEMENT TABLE 15B'

| ADDITIONAL MANAGEMENT INFORMATION | IMAGE MANAGEMENT INFORMATION |
|---|---|
| SCE10001 | SCE00001 |
| SCE10002 | SCE00002 |
| SCE10003 | SCE00003 |
| ⋮ | |

INFORMATION PROCESSING APPARATUS, INFORMATION PROCESSING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2017-100868, filed on May 22, 2017 in the Japan Patent Office, the entire disclosure of which is hereby incorporated by reference herein.

BACKGROUND

Technical Field

Aspects of the present disclosure relate to an information processing apparatus, an information processing method, and a non-transitory recording medium storing program code.

Related Art

In recent years, techniques for printing with special color ink, such as clear toner, are increasingly used. In the printing with special color ink, an image object (hereinafter referred to as a special color object) to be printed with the special color ink is placed on an existing image object of an original. Such a process allows printing with special color ink.

SUMMARY

In an aspect of the present disclosure, there is provided an information processing apparatus that includes circuitry to designate an attribute of an image object to be superimposed with an additional object; perform first identification to identify an image object indicating the attribute designated, among image objects included in image data; perform second identification to identify an image object that has not yet been superimposed with an additional object, among image objects identified by the first identification; and generate the additional object to be superimposed on the image object identified by the second identification.

In another aspect of the present disclosure, there is provided an information processing method that includes designating an attribute of an image object to be superimposed with an additional object; performing first identification to identify an image object indicating the attribute designated, among image objects included in image data; performing second identification to identify an image object that has not yet been superimposed with an additional object, among image objects identified by the first identification; and generating the additional object to be superimposed on the image object identified by the second identification.

In still another aspect of the present disclosure, there is provided a non-transitory recording medium storing program code to, when executed by one or more processors, cause the one or more processors to execute a method including designating an attribute of an image object to be superimposed with an additional object; performing first identification to identify an image object indicating the attribute designated, among image objects included in image data; performing second identification to identify an image object that has not yet been superimposed with an additional object, among image objects identified by the first identification; and generating the additional object to be superimposed on the image object identified by the second identification.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 9 is an illustration of an example of generation of the special color object;

FIGS. 11A to 11C are schematic diagrams of examples of data configuration of additional management information and image management information;

FIGS. 12A to 12F are schematic diagrams of an example of transition of object configuration and data structure of a management table;

FIG. 13 is a schematic diagram of an example of a management table;

Figure 1:
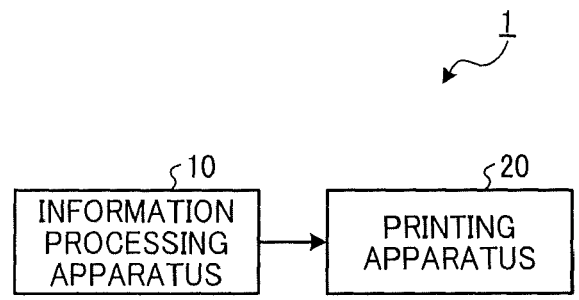
FIG. 1 is a diagram of an example of a configuration of an information processing system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Hereinafter, an information processing apparatus, an information processing method, and a non-transitory recording medium storing an information processing program according to embodiments of the present disclosure are described with reference to the accompanying drawings.

FIG. 1 is a diagram of an example of a configuration of an information processing system 1 according to an embodiment of the present disclosure. As illustrated in FIG. 1, the information processing system 1 includes an information processing apparatus 10 and a printing apparatus 20. The information processing apparatus 10 and the printing apparatus 20 are connected via a wired or wireless communication line so as to be able to exchange data and signals with each other.

The information processing apparatus 10 transmits print data to the printing apparatus 20. For example, the information processing apparatus 10 transmits print data including only color plane data to the printing apparatus 20. The information processing apparatus 10 may transmit print data obtained by integrating color plane data and gloss-control plane data to the printing apparatus 20.

The color plane data is print data defining an image to be formed in color. In detail, the color plane data is print data in which colored density values, such as RGB or CMYK, are specified for each drawing area.

The gloss-control plane data is an example of print data to be printed with a special color. Gloss-control plane data is print data defining a gloss effect to be imparted to paper. In detail, the gloss-control plane data is print data specifying the region to which the gloss effect is applied and the type of the gloss effect, to control adhesion of a special color according to the gloss effect, which is a visual or tactile effect to be applied to the paper.

The gloss-control plane data represents the region to which the gloss effect is applied with density values of 0 to 100%. Instead of the density values of 0 to 100%, the density value may be represented with gradation values of 0 to 255. The density values defined in the gloss-control plane data are values corresponding to the type of the gloss effect. For example, for each of a plurality of types of gloss effects, the corresponding range of density values is predetermined.

The special colors are, for example, metallic color by metal, white, transparent, fluorescent color, and the like. Metallic color is a color reproducing metallic luster. The metallic color is, for example, golden color or silver color. The metallic color may be a basic metallic color, such as gold color or silver color, and furthermore, a color with coloring, such as CMYK or RGB, added. Further, the fluorescent color may be any color as long as a color tone, such as CMYK, is shown in a fluorescent color. The term "transparent" means, for example, that the transmittance is 70% or more.

The printing apparatus 20 performs printing based on the print data received from the information processing apparatus 10. For example, the printing apparatus 20 is an electrophotographic printing apparatus.

In the case of the electrophotographic method, the printing apparatus 20 includes, for example, at least color toners of cyan, magenta, yellow and black and a clear toner which is a special color. Further, the printing apparatus 20 includes an image forming unit, which includes a photoconductor, a charger, a developing device, and a photoconductor cleaner, and an exposure device, corresponding to each toner. The printing apparatus 20 emits light from the exposure device according to the print data received from the information processing apparatus 10 to form a toner image on the photoconductor, and transfers the toner image onto a recording medium. The transferred toner image is fixed on the recording medium. Thus, an image is printed on the recording medium.

As a printing method of the printing apparatus 20, various known techniques can be used. For example, the printing apparatus 20 may be an apparatus that performs printing using an inkjet method.

The information processing apparatus 10 performs various processes on original data, converts the original data into print data that can be executed by the printing apparatus 20, and transmits the print data to the printing apparatus 20.

Original data is an example of image data. The original data includes one or a plurality of image objects. In the present embodiment, the information processing apparatus 10 performs processing of newly placing an additional object on an image object included in the original data.

The additional object is an image object newly added and arranged on an existing image object included in the original data in advance. In the present embodiment, a case in which the additional object is a special color object is described as an example.

The special color object is an image object represented by a special color. Note that the additional object is not limited to the special color object. For example, the additional object may be a colored image object.

In the present embodiment, a case in which the additional object is a special color object is described as an example. Therefore, in the present embodiment, a description is given on the assumption that, if an image object is referred to as a special color object, the object indicates an additional object.

Next, a configuration of the information processing apparatus 10 is described. The information processing apparatus 10 is an example of an information processing apparatus.

Figure 2:
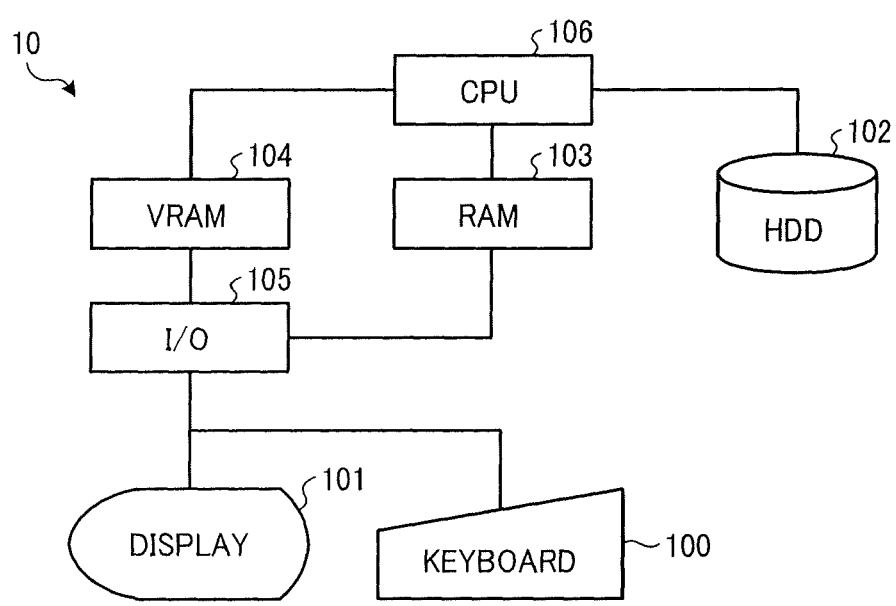
FIG. 2 is a diagram of an example of a hardware configuration of an information processing apparatus.

FIG. 2 is a diagram of an example of a hardware configuration of the information processing apparatus 10. The information processing apparatus 10 includes a keyboard 100, a display 101, a hard disk drive (HDD) 102, a random access memory (RAM) 103, a volatile random access memory (VRAM) 104, a read only memory (ROM), an input-and-output interface (I/O) 105, and a central processing unit (CPU) 106. The information processing apparatus 10 has a hardware configuration having functions as a computer.

A keyboard 100 is an example of an input device (operation unit). A display 101 is an example of a display.

Note that each function of the information processing apparatus 10 described below may be implemented by the CPU 106 executing a program or at least a part of each function of the information processing apparatus 10 may be implemented by a dedicated hardware circuit. The program executed by the CPU 106 may be recorded in a computer-readable recording medium, such as a compact disc-read only memory (CD-ROM), a compact disc-recordable (CD-R), or a digital versatile disc (DVD), in an installable or executable file format and provided as a computer program product.

Figure 3:
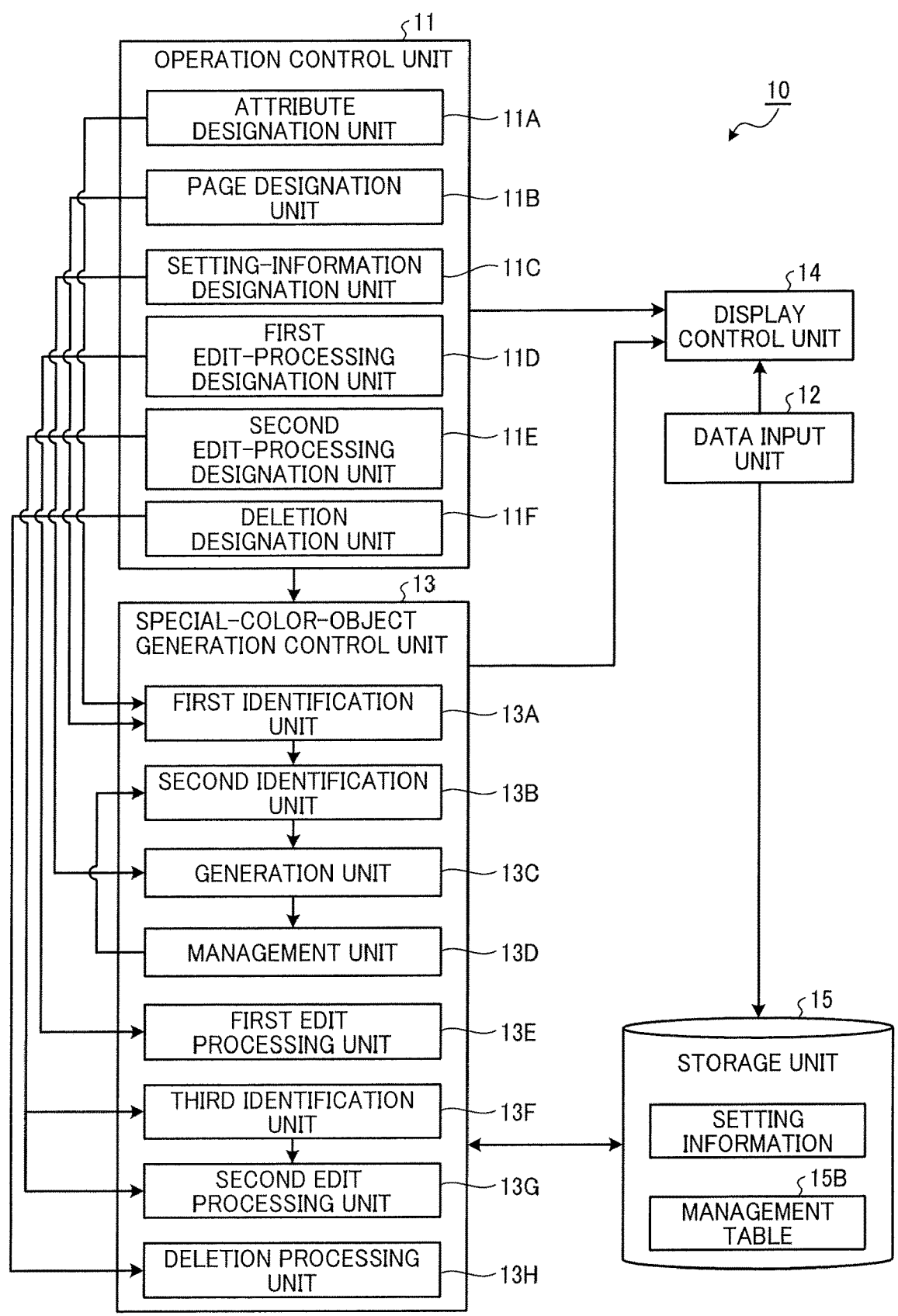
FIG. 3 is a diagram of an example of functions of the information processing apparatus.

FIG. 3 is a diagram of an example of functions of the information processing apparatus 10. For the sake of convenience of explanation, FIG. 3 mainly illustrates a portion related to a function of generating a special color object as the additional object. However, the functions of the information processing apparatus 10 are not limited to the functions illustrated in FIG. 3.

The information processing apparatus 10 includes an operation control unit 11, a data input unit 12, a special-color-object generation control unit 13, a display control unit 14, and a storage unit 15.

The data input unit 12 reads original data designated in accordance with an operation using an input device, such as the keyboard 100, from a memory, such as the HDD 102 or an external device, and records the read data in the storage unit 15.

The display control unit 14 performs control to display various screens and images on a display (for example, the display 101), such as a liquid crystal display. For example, the display control unit 14 displays original data read by the data input unit 12 and various operation screens, which are described later, on the display 101.

The storage unit 15 stores various data. The storage unit 15 is implemented by, for example, the HDD 102 or the RAM 103. In the present embodiment, the storage unit 15 stores original data stored by the data input unit 12, setting information, and a management table 15B. The setting information and the management table 15B are described in detail later.

The operation control unit 11 generates event information according to various operations using the input device, such as the keyboard 100. The operation control unit 11 notifies the special-event-object generation control unit 13, which is described later, of the generated event information.

Examples of the event information include information instructing to generate a special color object, information indicating an attribute of an image object to be superimposed with an additional object, information indicating a page to be processed for generating a special color object, setting information, information indicating first edit processing, information indicating second edit processing, and information indicating an additional object to be deleted. Such information is specified by each functional unit included in the operation control unit 11 (described in detail later).

The operation control unit 11 includes an attribute designation unit 11A, a page designation unit 11B, a setting-information designation unit 11C, a first edit-processing designation unit 11D, a second edit-processing designation unit 11E, and a deletion designation unit 11F.

In accordance with an operation by the user, the attribute designation unit 11A designates the attribute of an image object to be superimposed with a newly added special color object. The attribute of the image object indicates, for example, the type of the image object. Attributes of the image object are, for example, text, graphics, and image. The attributes of the image object are not limited to the above-described examples.

The page designation unit 11B designates one or more pages on which the special color object is to be generated in the original data in response to an operation by the user. For example, the original data is a collection of a plurality of pages. The original data is, for example, data in portable document format (PDF). The data format of the original data and the number of pages are not limited to the above-described examples.

Figure 4:
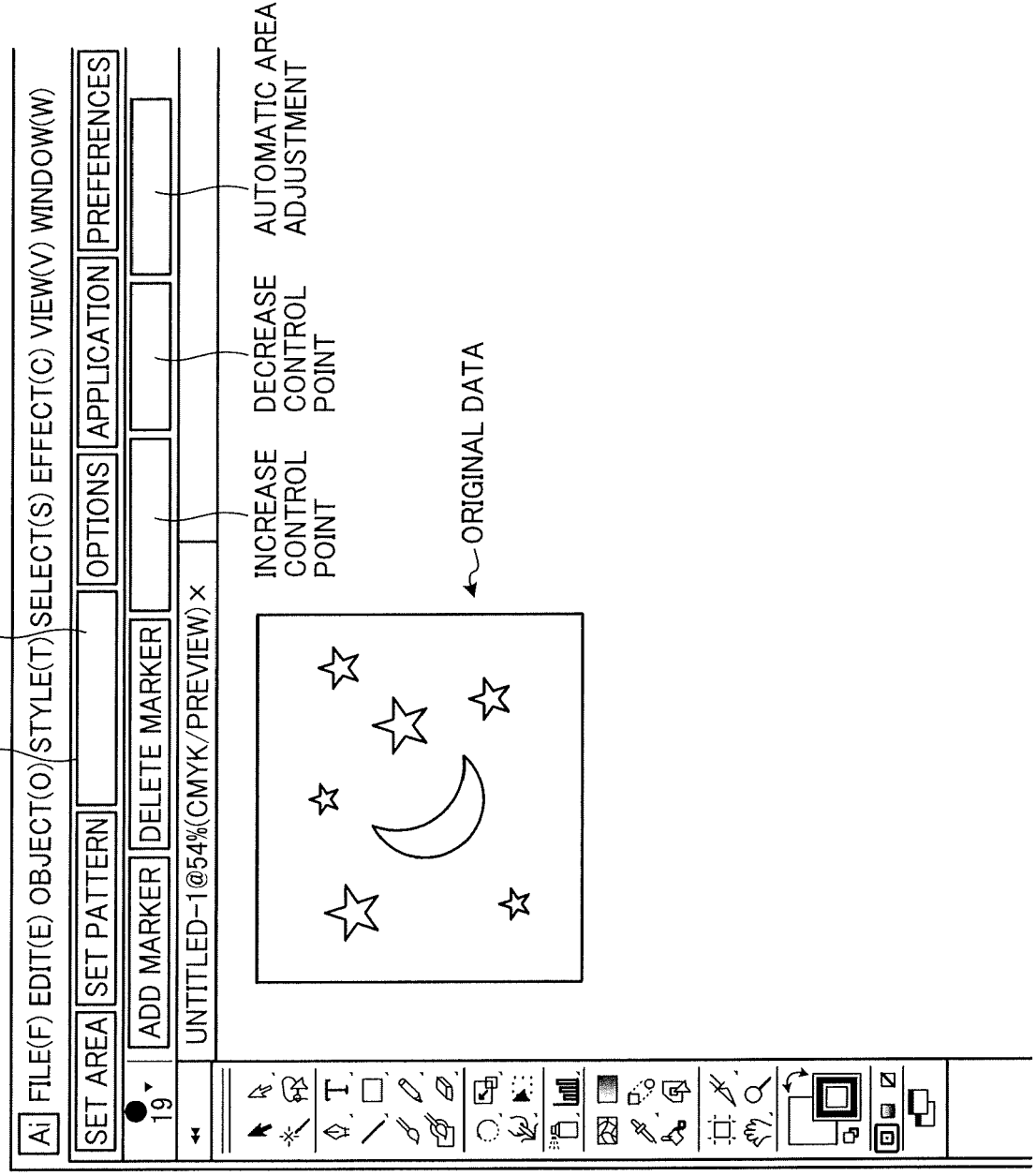
FIG. 4 is a diagram of an example of a user interface.

In the present embodiment, the operation control unit 11 receives various operations by the user via an user interface (UI) displayed on the display 101 by the display control unit 14. FIG. 4 is a diagram of an example of the UI.

For example, original data is displayed on the UI. In an example of FIG. 4, a button 141 for instructing generation of a special color object is displayed on the UI. When receiving the press of the button 141 by the user, the operation control unit 11 displays an operation screen for receiving the designation of the attribute of the image object to be superimposed with a newly added special color object and the designation of the page to be processed in the processing of generating the special color object. The operation screen may be a sub screen for a main screen.

In response to the operation received via the operation screen, the attribute designation unit 11A designates the attribute of the image object to be superimposed with the additional object. For example, the user instructs an operation on any one of a plurality of image objects included in the original data displayed on the UI through the operation screen. The attribute designation unit 11A designates the attribute of the image object on which the operation is instructed, as the attribute of the image object to be superimposed with the additional object.

The page designation unit 11B designates a page to be processed for generating a special color object, according to the operation received via the operation screen. For example, through the operation screen, the user instructs an operation on a page to be superimposed with an additional object in the original data displayed on the UI. The page designation unit 11B designates the page on which the operation is instructed, as the page to be processed for generating the special color object.

Note that the UI is not limited to the above-described example. For example, each of a button for receiving the designation of the attribute of the image object to be superimposed with the special color object and a button for receiving the designation of the page to be processed for generating the special color object may be separately displayed on the UI.

Returning to FIG. 3, a description is continued below. The setting-information designation unit 11C designates the setting information of a special color object to be generated according to an operation by the user.

The setting information is information indicating settings for the special color object. The setting information includes at least information indicating a density value corresponding to a type of the gloss effect.

When the setting information of the special color object to be generated is stored in the storage unit 15, the setting-information designation unit 11C reads the setting information from the storage unit 15. The setting-information designation unit 11C specifies the read setting information. If the setting information of the special color object to be generated is not stored in the storage unit 15, the setting-information designation unit 11C designates the setting information according to an instruction from the user.

For example, the operation screen includes a plurality of setting buttons that corresponds one-to-one to a plurality of types of gloss effects and receives selection of setting information for achieving corresponding types of gloss effects.

When receiving the user's pressing of any of the setting buttons, the setting-information designation unit 11C checks whether the setting information for achieving the gloss effect of the type corresponding to the pressed setting button is stored in the storage unit 15. The setting-information designation unit 11C reads the setting information from the storage unit 15 and designates the read setting information.

Note that the setting information may not be stored in the storage unit 15. In such a case, the display control unit 14 may display a screen prompting input of setting information.

The setting-information designation unit 11C may designate the setting information received via the screen.

In the present embodiment, the user performs an operation for designating the attribute of the image object to be superimposed with the special color object, the page to be processed for generating the special color object, and the setting information of the special color object to be generated, and performs an operation for instructing generation and execution of the special color object. The operation for instructing generation and execution of the special color object is, for example, an operation of pressing a button image for instructing generation and execution of a special color object.

When receiving the operation, the operation control unit 11 instructs the special-color-object generation control unit 13 to generate the special color object based on various designations (designations of attributes, pages, setting information, etc.). For example, the operation control unit 11 notifies the special-color-object generation control unit 13, which is described later, of event information that includes information instructing generation of the special color object, information indicating the attribute designated by he attribute designation unit 11A, information indicating the page designated by the page designation unit 11B, and setting information designated by the setting-information designation unit 11C.

Next, the first edit-processing designation unit 11D is described. The first edit-processing designation unit 11D is an example of the edit-processing designation unit. The first edit-processing designation unit 11D designates the first edit processing of the image object in response to the user's operation on the input device.

The first edit processing is an example of edit processing. The first edit processing is processing of changing the size, position, or shape of the image object or deleting the image object.

For example, a button for receiving designation of the first edit processing is displayed on the UI for each edit content of the first edit processing of the image object. The edit content indicates size change, position change, shape change, deletion, etc. The first edit-processing designation unit 11D designates the first edit processing of the edit content corresponding to a pressed button.

For example, the user performs an operation for designating the edit content of the first edit processing using the input device. Then, the user uses the input device to instruct the operation on the image object to be subjected to the first edit processing, and further performs an operation for instructing execution of the first edit processing.

The first edit-processing designation unit 11D receives, from the input device, information indicating that the edit processing to be executed is the first edit processing, information indicating the image object to be subjected to the first edit processing, and information indicating edit content of the first edit processing. The information indicating the image object to be subjected to the first edit processing may be any information that can uniquely identify the image object in the original data. The first edit-processing designation unit 11D receives such pieces of information to designate the first edit processing.

The first edit-processing designation unit 11D notifies the special-color-object generation control unit 13 of the event information indicating the designated first edit processing.

In the following description, the event information indicating the first edit processing may be referred to as first edit event information. The first edit event information includes information indicating that the edit processing to be executed is the first edit processing, information indicating the image object to be subjected to the first edit processing, information indicating edit content of the first edit processing.

The second edit-processing designation unit 11E designates the second edit processing of the special color object in response to the user's operation on the input device. The second edit processing indicates various types of edit processing other than deletion to be collectively performed on all special color objects included in the original data.

For example, the second edit processing is processing of changing the size, position, or shape of the special color object or changing the density value of the special color object. The processing of changing the density value of the special color object corresponds to processing of changing the type of gloss effect of the special color object.

For example, the display control unit 14 displays a button on the UI for receiving designation of the second edit processing for each edit content of the second edit processing of the special color object. The edit contents of the second edit processing include changing the size of the special color object, changing the position, changing the shape, changing the density value, and the like. The second edit-processing designation unit 11E designates the second edit processing of edit content corresponding to a pressed button.

For example, the user performs an operation for designating the second edit processing with the input device. The user performs an operation for instructing execution of the second edit processing. The second edit-processing designation unit 11E receives information indicating that the edit processing to be executed is the second edit processing and information indicating edit content of the second edit processing from the input device. The second edit-processing designation unit 11E receives such pieces of information to designate the second edit processing. The second edit-processing designation unit 11E notifies the special-color-object generation control unit 13 of the event information indicating the designated second edit processing.

In the following description, event information indicating the second edit processing is referred to as second edit event information. The second edit event information includes information indicating that the edit processing to be executed is the second edit processing and information indicating edit content of the second edit processing.

The deletion designation unit 11F designates a special color object to be deleted according to a user's operation on the input device.

For example, the user instructs an operate on the special color object to be deleted in the original data displayed on the UI, and performs an operation for designating execution of the deletion. The deletion designation unit 11F receives, from the input device, information indicating deletion of the special color object and information indicating the special color object to be deleted. The information indicating the special color object to be deleted is any information included in the original data that can uniquely identify a special color object. The deletion designation unit 11F receives such pieces of information to designate the special color object to be deleted.

The deletion designation unit 11F notifies the special-color-object generation control unit 13 of event information indicating the designated special color object to be deleted. In the following description, the event information indicating a special color object to be deleted may be referred to as special-color deletion event information. The special-color deletion event information includes information indicating deletion of a special color object and information indicating a special color object to be deleted.

Next, the special-color-object generation control unit 13 is described. The special-color-object generation control unit 13 performs control for generating a special color object and control for editing a special color object based on the event information notified from the operation control unit 11.

For example, the special-color-object generation control unit 13 includes a first identification unit 13A, a second identification unit 13B, a generation unit 13C, a management unit 13D, a first edit processing unit 13E, a third identification unit 13F, a second edit processing unit 13G, and a deletion processing unit 13H.

The first identification unit 13A identifies all image objects indicating the attributes designated by the attribute designation unit 11A from the plurality of image objects included in the original data. More specifically, the first identification unit 13A identifies all image objects indicating the attributes designated by the attribute designation unit 11A from the plurality of image objects included in the page designated by the page designation unit 11B.

For example, it is assumed that the attribute designation unit 11A has designated the attribute "text". Further, it is assumed that the page designation unit 11B designates the first to third pages. In such a case, the first identification unit 13A identifies all image objects of the attribute "text" included in the first to third pages of the original data.

The second identification unit 13B identifies an image object not yet layered with a special color object (that is, an additional object) out of the image objects designated by the first identification unit 13A. The image object not yet layered with the special color object represents, in other words, an image object on which the special color object is not superimposed and placed.

Note that the expression that "the special color object is superimposed (layered)" means that at least a part of the special color object is superimposed on the image object. Therefore, the image object not yet layered with the special color object indicates an image object on which at least a part of the special color object is not superimposed on the image object.

Using the information managed by the management unit 13D, the second identification unit 13B identifies an image object not layered with an additional object in the original data, which is described in detail later.

The generation unit 13C generates a special color object to be superimposed on the image object identified by the second identification unit 13B. Specifically, for each image object identified by the second identification unit 13B, the generation unit 13C generates a special color object to be at least partially superimposed on the image object.

In the present embodiment, the generation unit 13C generates a special color object, having the same size and shape as the image object, to be superimposed on the image object, for each image object identified by the second identification unit 13B.

The generation unit 13C may generate the special color object so that at least a part of the special color object is superimposed on the image object identified by the second identification unit 13B. Therefore, the generation unit 13C is not limited to a mode of generating a special color object, having the same size, shape, and position as the image object, so that the special color object is completely superimposed on the image object. In the present embodiment, the case in which the generation unit 13C generates the special color object having the same size, shape, and position as the image object so that the special color object is completely superimposed on the image object is described as an example.

The generation unit 13C also adds, to the generated special color object, additional tag information indicating that the generated special color object is an additional object, and embeds the additional tag information in the original data.

Figures 5, 6:
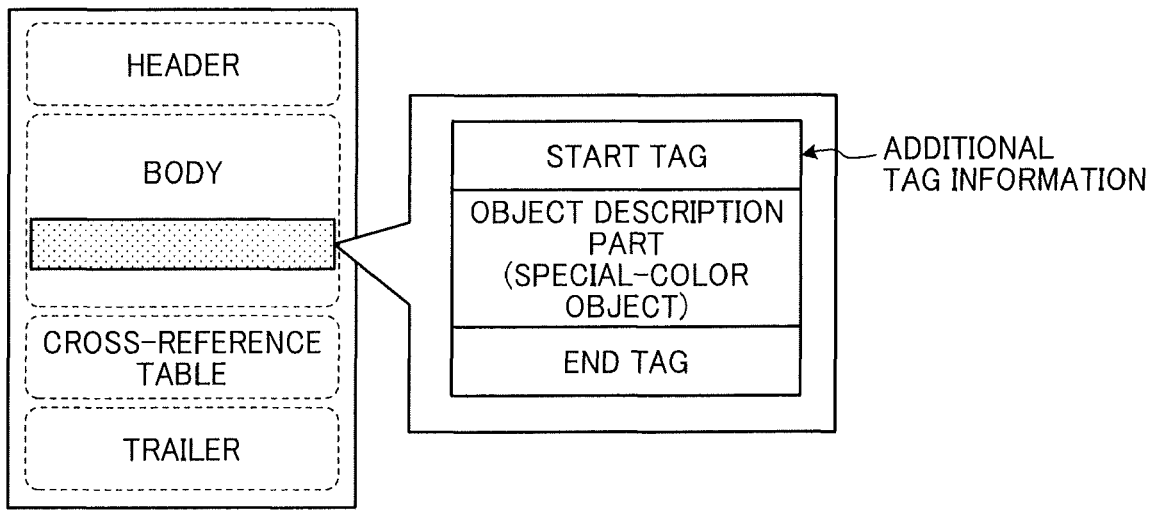
FIG. 5 is a diagram of an example of file structure of original data.
FIG. 6 is a schematic diagram of an example of data format of setting information.

FIG. 5 is a diagram of an example of the file structure of original data. As described above, the original data in the present embodiment is PDF format data, and includes a header, a body, a cross reference table, and a trailer. In the present embodiment, the generation unit 13C adds a start tag indicating the start of the special color object and an end tag indicating the end of the special color object to the special color object as an additional object. The generation unit 13C embeds, in the start tag, additional tag information indicating that the special color object is an additional object.

Returning to FIG. 3, the description is continued below. Using the setting information designated by the setting-information designation unit 11C, the generation unit 13C generates a special color object for each image object identified by the second identification unit 13B. The generation unit 13C stores, in the storage unit 15, the setting information used for generating the special color object. The setting information is common setting information to the special color object generated for each image object identified by the second identification unit 13B.

The data format of the setting information is any data format. FIG. 6 is a schematic diagram of an example of the data format of setting information. The setting information may be an XML data format as illustrated in FIG. 6. The data format of the setting information is not limited to XML.

Note that at least a part of an image object (referred to as "second image object" for convenience of explanation) having a higher priority of display than the image object (referred to as "first image object" for convenience of explanation) to be superimposed with the special color object may be superimposed on the first image object. That is, another image object is placed on an upper layer side of the image object to be superimposed with the special color object.

In such a case, the generation unit 13C generates a special color object so that the priority of display of the special color object is higher than the priority of display of the first image object and lower than the priority of display of the second image object.

Figure 7:
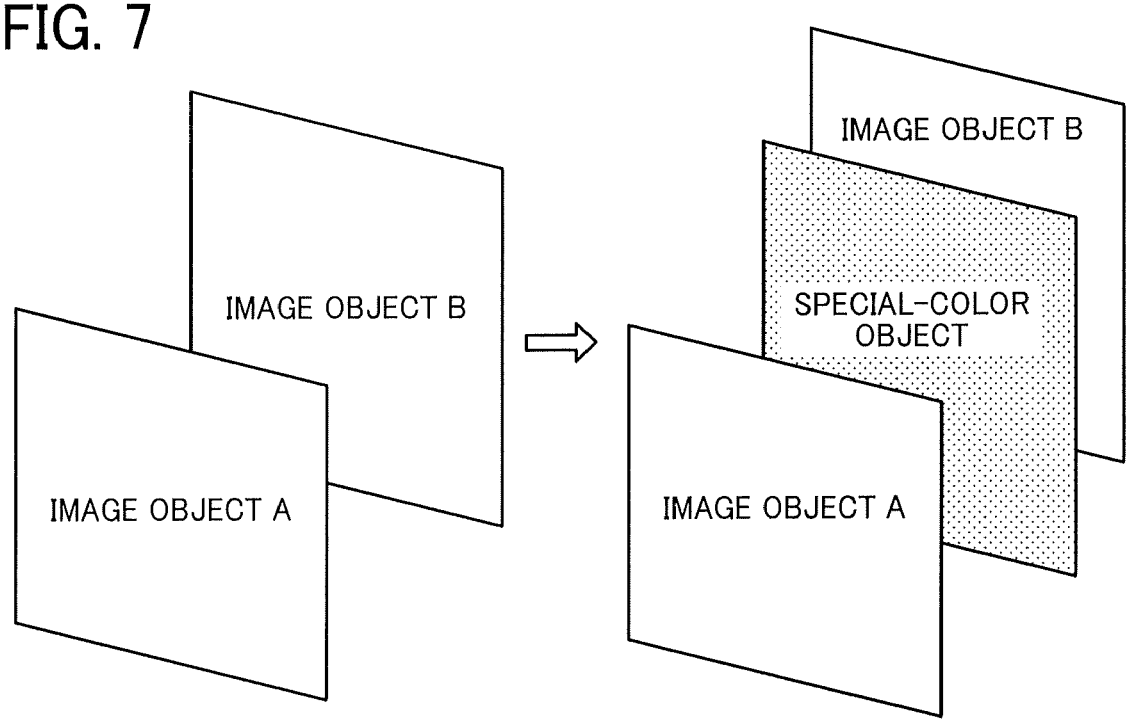
FIG. 7 is a conceptual diagram of a method of generating a special color object.

FIG. 7 is a conceptual diagram of a method of generating a special color object. Image object B is an example of the first image object and image object A is an example of the second image object. It is assumed that the user designates the attribute of the image object B as a target to be superimposed with the special color object. In such a case, the attribute designation unit 11A designates the attribute of the image object B. The generation unit 13C generates a special color object having the same size and shape as the image object B so as to be placed immediately above the image object B. Therefore, the image object A with a higher priority of display than the image object B is not hidden by the generated special color object.

Figure 8:
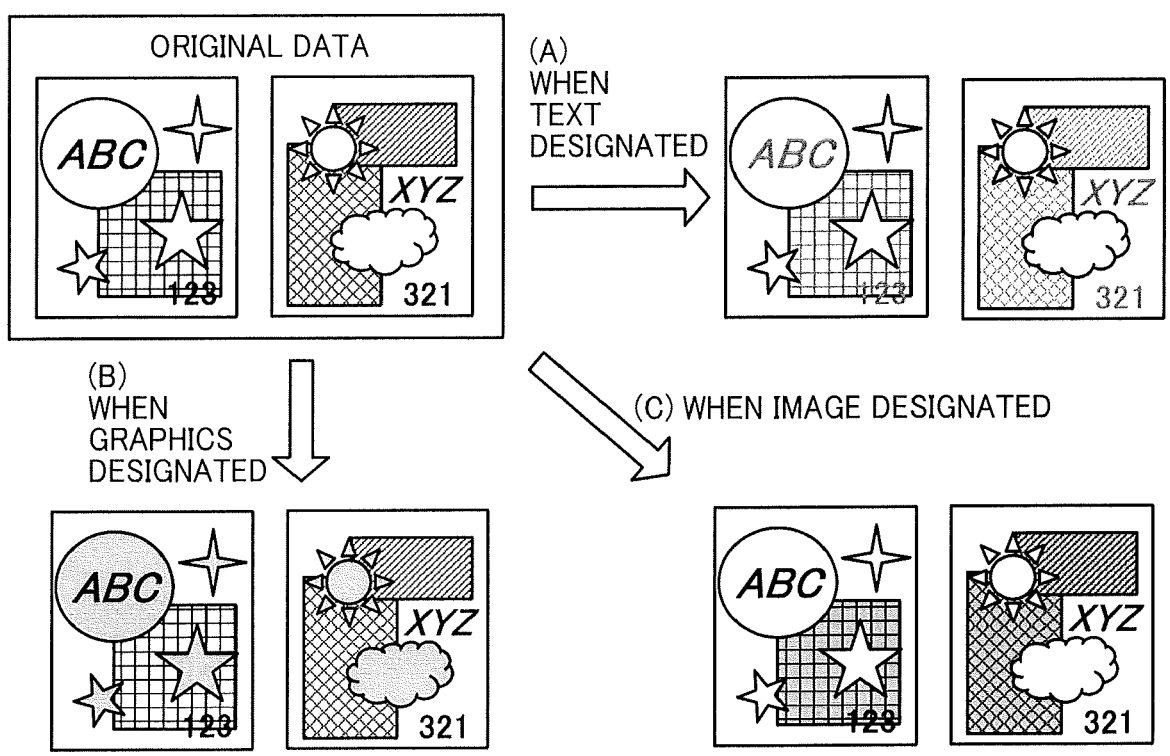
FIG. 8 is a conceptual diagram of generation of the special color object.

FIG. 8 is a conceptual diagram of generation of the special color object. As illustrated in (A) of FIG. 8, it is assumed that "text" is designated as an attribute of an image object as a target for generating a special color object. In such a case, just above an image object indicating the attribute of "text" among the image objects included in the initial original data, a special color object indicating the attribute of "text" having the same shape as the image object is generated.

Further, as illustrated in (B) of FIG. 8, it is assumed that "graphics" is designated as an attribute of an image object to be superimposed with a special color object. In such a case, just above an image object indicating the attribute of "graphics" among the image objects included in the initial original data, a special color object indicating the attribute of "graphics" having the same shape as the image object is generated.

Further, as illustrated in (C) of FIG. 8, it is assumed that "image" is designated as an attribute of an image object to be superimposed with a special color object. In such a case, just above an image object indicating the attribute of "image" among the image objects included in the initial original data, a special color object indicating the attribute of "image" having the same shape as the image object is generated.

As described above, in the present embodiment, the generation unit 13C generates a special color object so that the special color object is superimposed on each of all image objects that indicate the designated attributes and are not yet layered with the special color object among the image objects included in the original data.

Here, it is assumed that the generation unit 13C has generated a special color object for each of the image objects identified by the first identification unit 13A, not the image object identified by the second identification unit 13B. In such a case, the following problem may occur.

FIG. 9 is an illustration of an example of generation of the special color object. For example, as illustrated in (A) of FIG. 9, it is assumed that the initial original data includes a plurality of image objects (image objects 50A to SOD). It is also assumed that special color objects 60B and 60C are superimposed on the image objects SOB and SOC (see (B) of FIG. 9), for example, by an operation instruction of the input device by the user.

It is further assumed that the user designates an attribute common to the image objects 50A to 50D. Then, the first identification unit 13A identifies the image objects 50A to 50D. When the generation unit 13C generates special color objects for the image objects 50A to 50D identified by the first identification unit 13A, for example, a state illustrated in (C) of FIG. 9 occurs. That is, as illustrated in (C) of FIG. 9, the generation unit 13C generates special color objects 62A to 62D for the image objects 50A to 50D identified by the first identification unit 13A.

Accordingly, when the generation unit 13C generates special color objects for the image objects identified by the first identification unit 13A, the special color objects 62B and 62C are further superimposed and generated even on the image objects 50B and 50C on which the special color objects 60B and 60C have already been superimposed (see (C) of FIG. 9).

Figure 10C:
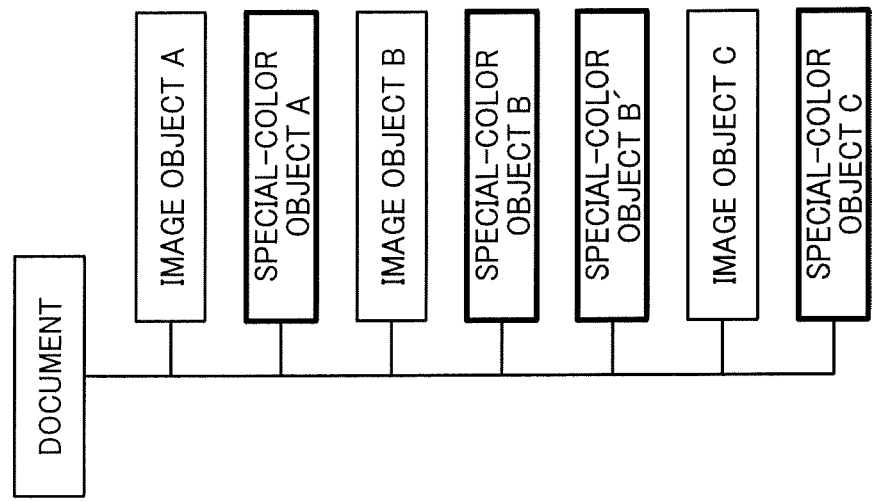
FIGS. 10A to 10C are diagrams of examples of object configuration.
Figure 10B:
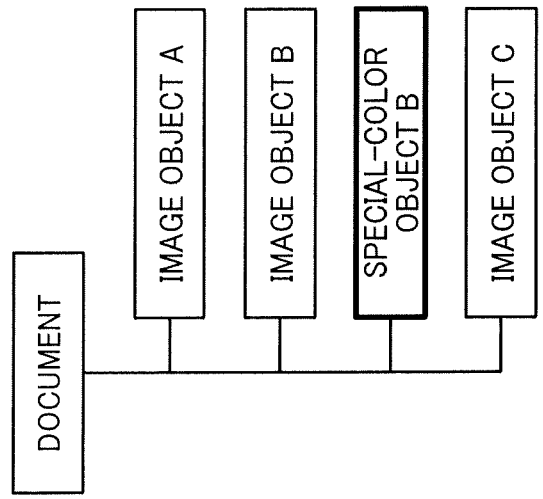
Figure 10A:
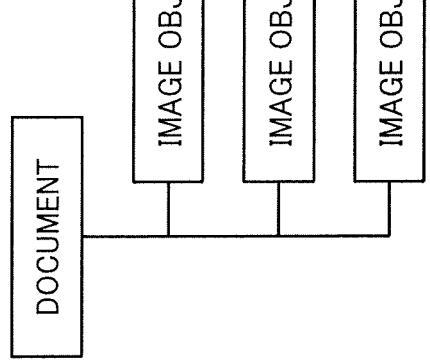

FIGS. 10A to 10C illustrate examples of the object configuration of a special color object obtained when the generation unit 13C generates the special color object for an image object identified by the first identification unit 13A.

For example, as illustrated in FIG. 10A, it is assumed that image data A to C are included in original data.

Then, it is assumed that the user designates an attribute specific to the image object B. Then, the first identification unit 13A identifies the image object B. When the generation unit 13C generates the special color object B for the image object B identified by the first identification unit 13A, the object configuration illustrated in FIG. 10B is obtained.

It is further assumed that the user designates an attribute common to the image objects A to C. Then, the first identification unit 13A identifies the image objects A to C. Then, it is assumed that the generation unit 13C has generated special color objects for the image objects A to C identified by the first identification unit 13A. In such a case, the object configuration illustrated in FIG. 10C is obtained. As described above, a special color object B' is further superimposed on the image object B on which the special color object B has already been superimposed.

Therefore, when the generation unit 13C generates a special color object for the image object identified by the first identification unit 13A, a special color object may be further generated on the superimposed special color object. Consequently, special color objects according to the intention of the user may not be generated. In addition, when a plurality of special color objects is generated in a superimposed manner, the data size of the original data sometimes may become unnecessarily large.

Hence, in the present embodiment, the generation unit 13C generates a special color object so that the special color object is superimposed on the image object identified by the second identification unit 13B. That is, as illustrated in (D) of FIG. 9, the generation unit 13C generates the special color objects 62A and 62D for the image objects 50A and 50D that indicate attributes designated by the user and are not yet superimposed with the special color objects, so that the special color objects 62A and 62D are superimposed on the image objects 50A and 50D. Therefore, in the present embodiment, the generation unit 13C does not generate further special color objects for the image objects 50B and 50C on which the special color objects 60B and 60C have already been generated. The generation unit 13C generates the special color objects 62A and 62D only for the image objects 50A and 50D on which the special color objects are not yet superimposed so that the special color objects 62A and 62D are superimposed on the image objects 50A and 50D.

That is, in the present embodiment, the generation unit 13C collectively generates the special color objects for the image objects identified by the second identification unit 13B among the image objects identified by the first identification unit 13A so that the special color objects are superimposed on the image objects identified by the second identification unit 13B.

Therefore, the information processing apparatus 10 according to the present embodiment can generate additional objects according to the intention of the user.

Returning to FIG. 3, the description is continued below. As described above, the second identification unit 13B uses the information managed by the managing unit 13D to identify an image object not yet superimposed with a special color object among the image objects identified by the first identification unit 13A.

The management unit 13D is described in detail. The management unit 13D manages additional management information and image management information in one-to-one correspondence. The management in one-to-one correspondence means that there is one piece of image management information managed corresponding to additional management information of a certain value. Likewise, the management in one-to-one correspondence also means that there is one additional management information managed corresponding to image management information of a certain value.

The additional management information is information for identifying a special color object as an additional object in the original data. The image management information is information for identifying the image object on which the special color object is superimposed in the original data.

In other words, the management unit 13D manages the additional management information of the special color object generated by the generation unit 13C and the image management information of the image object superimposed with the specific color object in one-to-one correspondence.

FIGS. 11A to 11C are schematic diagrams of examples of the data configuration of additional management information and image management information. FIG. 11A is a schematic diagram of an example of the data configuration of additional management information. The additional management information illustrated in FIG. 11A includes an application ID, additional flag information, and common identification information.

The application ID is identification information of an application for executing information processing performed by the special-color-object generation control unit 13. Note that the additional management information may not include the application ID. In FIG. 11A, "SCE" is illustrated as an example of the application ID.

The additional flag information is information indicating that the special color object is an additional object. For example, the additional flag information is information indicating a "child" flag. In FIG. 11A, a case in which the information indicating the "child" flag is "1" is illustrated as an example. The information indicating the "child" flag indicates whether, when the image object is "parent", the object is a special color object superimposed on the image object, that is, a special color object corresponding to a "child" constituting a pair with the image object.

Common identification information is identification information common to the image object superimposed with the specific color object and the specific color object. In other words, the common identification information is information commonly included in the additional management information and the image management information managed in one-to-one correspondence. In FIG. 11, "0001" is illustrated as an example of the common identification information.

FIG. 11B is a schematic diagram of an example of the data configuration of image management information. The image management information illustrated in FIG. 11B includes an application ID, image flag information, and common identification information.

The application ID is the same as the additional management information. Note that the image management information may not include the application ID.

The image flag information is information indicating that the object is an image object. For example, the image flag information is information indicating a "parent" flag. In FIG. 11B, a case in which the information indicating the "parent" flag is "0" is illustrated as an example. The information indicating the "parent" flag is information indicating whether, when the special color object is "child", the object is an image object superimposed with the specific color object, that is, an image object corresponding to "parent" constituting a pair with the special color object.

The common identification information included in the image management information is the same as the common identification information included in the additional management information.

FIG. 11C is a schematic diagram of an example of the data configuration of the management table 15B. The management table 15B is a table for managing common identification information. The data format of the management table 15B is not limited to the table format.

The management unit 13D adds the additional management information to the special color object generated by the generation unit 13C, and embeds the additional management information in the image data. For example, the management unit 13D records the additional management information in the start tag (see FIG. 5) of the special color object generated by the generation unit 13C.

The management unit 13D adds the image management information to the image object on which the generated special color object has been superimposed, and embeds the image management information in the image data. For example, the management unit 13D records the image management information in the start tag indicating the start of the image object.

The management unit 13D registers, in the management table 15B, common identification information commonly included in the additional management information added to the special color object and the image management information added to the image object on which the special color object has been superimposed. Thus, the management unit 13D stores the common identification information in the storage unit 15.

Returning to FIG. 3, the description is continued below. Using the information managed by the management unit 13D, the second identification unit 13B identifies an image object not yet layered with a special color object among the image objects identified by the first identification unit 13A.

Specifically, for example, the second identification unit 13B identifies an image object not attached with the image management information, among the image objects identified by the first identification unit 13A, as an image object not yet layered with the special color object.

Further, for example, the second identification unit 13B identifies the image management information attached to the image object identified by the first identification unit 13A. When the common identification information of an image object included in the specified image management information is not registered in the management table 15B, the second identification unit 13B may identify the image object as the image object not yet layered with the special color object.

Further, for example, the second identification unit 13B identifies the image management information attached to the image object identified by the first identification unit 13A. The second identification unit 13B identifies the common identification information included in the specified image management information. Further, the second identification unit 13B determines whether the special color object to which the additional management information including the identified common identification information is attached exists in the original data. When the second identification unit 13B determines that the special color object to which the additional management information including the identified common identification information is attached does not exist in the original data, the second identification unit 13B may identify the image object attached with the image management information including the common identification information as the image object not yet layered with the special color object.

FIGS. 12A to 12F are schematic diagrams of an example of a transition of the object configuration and the data structure of the management table 15B. FIGS. 12A to 12F illustrates a transition obtained when the generation unit 13C generates a special color object for the image object identified by the second identification unit 13B.

For example, as illustrated in FIG. 12A, it is assumed that image objects A to C are included in the original data. At this stage, since the special color object is not generated, the common identification information is not registered in the management table 15B (see FIG. 12D).

Then, it is assumed that the user designates an attribute specific to the image object B. Then, the first identification unit 13A identifies the image object B. Since the image management information is not added to the image object B (see FIG. 12A), the second identification unit 13B identifies the image object B as the image object not yet layered with the special color object.

The generation unit 13C generates a special color object B that is superimposed on the image object B identified by the second identification unit 13B (see FIG. 12B).

When the special color object B is generated, the management unit 13D adds the additional management information to the special color object B (see FIG. 12B). For example, the management unit 13D adds, to the special color object B, additional management information "SCE 10001" including an application ID of "SCE", additional flag information of "1" indicating "child" flag, and common identification information of "0001", and embeds the additional management information in the original data (see FIG. 12B).

Further, the management unit 13D adds image management information to the image object B on which the specific color object B has been superimposed. For example, the management unit 13D adds, to the image object B, image management information "SCE 00001" including an application ID of "SCE", image flag information of "0" indicating "parent" flag, and common identification information of "0001", and embeds the image management information in the original data (see FIG. 12B).

The management unit 13D also registers, in the management table 15B (see FIG. 12E), the common identification information "0001" common to the special color object B and the image object B constituting the pair.

Next, it is assumed that the user designates attributes common to the image objects A to C. Then, the first identification unit 13A identifies the image objects A to C. The second identification unit 13B identifies an image object not yet layered with the special color object among the image objects A to C illustrated in FIG. 12B. For example, the second identification unit 13B identifies the image objects A and C to which the image management information is not added, as the image object not yet layered with the special color object.

The generation unit 13C generates and superimpose the special color objects A and C on the image objects A and C identified by the second identification unit 13B, respectively (see FIG. 12C).

When the special color objects A and C are generated, the management unit 13D adds the additional management information to the special color objects A and C. For example, the management unit 13D adds, to the special color object A, additional management information "SCE 10002" including an application ID of "SCE", additional flag information of "1" indicating "child" flag, and common identification information of "0002", and embeds the additional management information in the original data (see FIG. 12C).

The management unit 13D adds the image management information to the image object A on which the specific color object A has been superimposed. For example, the management unit 13D adds, to the image object A, image management information "SCE 00002" including an application ID of "SCE", image flag information of "0" indicating "parent" flag, and common identification information of "0002", and embeds the image management information in the original data (see FIG. 12C).

Similarly, the management unit 13D adds, to the special color object C, additional management information "SCE 10003" including an application ID of "SCE", additional flag information of "1" indicating "child" flag, and common identification information of "0003", and embeds the additional management information in the original data (see FIG. 12C).

Further, the management unit 13D adds the image management information to the image object C on which the specific color object C has been superimposed. For example, the management unit 13D adds, to the image object C, image management information "SCE 00003" including an application ID of "SCE", image flag information of "0" indicating "parent" flag, and common identification information of "0003", and embeds the image management information in the original data (see FIG. 12C).

The management unit 13D also registers, in the management table 15B (see FIG. 12F), the common identification information "0002" common to the special color object A and the image object A constituting the pair and the common identification information "0003" common to the special color object C and the image object C constituting the pair.

As described above, each time a special color object is generated by the generation unit 13C, the management unit 13D associates the additional management information and the image management information with respect to each of the generated special color object and the image object on which the special color object has been superimposed, and manages the additional management information and the image management information in one-to-one correspondence. Therefore, when the attribute of the image object to be superimposed with the additional object is next designated, the second identification unit 13B can easily identify the image object not yet layered with the additional object among the image objects indicating the designated attribute.

The method of managing the additional management information and the image management information with the management unit 13D is not limited to the above-described method. For example, the management unit 13D may store the additional management information and the image management information in a one-to-one correspondence in the storage unit 15. In such a case, the management unit 13D may store the management table 15B' (see FIG. 13) in the storage unit 15, instead of the management table 15B.

FIG. 13 is a schematic diagram of an example of the management table 15B'. As illustrated in FIG. 13, the storage unit 15 may store the management table 15B' in which the additional management information and the image management information are associated in one-to-one correspondence, instead of the management table 15B.

In such a case, information that can uniquely identify the special color object may be used as the additional management information registered in the management table 15B'. As the image management information, information that can uniquely identify the image object may be used.

When storing the management table 15B' in the storage unit 15, the management unit 13D may not embed the additional management information and the image management information in each of the corresponding special color object and the corresponding image object in the original data.

In the present embodiment, an example in which the management unit 13D manages the additional management information and the image management information using the management table 15B (see FIG. 11) is described as an example. Using the management table 15B facilitates management of the additional management information and the image management information. In the case of management using the management table 15B, identifying common identification information facilitates identification of a pair of the special color object and the image object.

Returning to FIG. 3, the description is continued below. Next, the first edit processing unit 13E is described. The first edit processing unit 13E is an example of the edit processing unit.

The first edit processing unit 13E receives the notification of the first edit event information from the operation control unit 11. As described above, the first edit event information is event information indicating the first edit processing designated by the first edit-processing designation unit 11D. As described above, the first edit processing is processing of changing the size, position, or shape of a specific image object or deleting an image object.

Based on the received first edit event information, the first edit processing unit 13E performs the first edit processing on the image object that is a target of the first edit processing and the special color object generated so as to be superimposed on the image object.

For example, it is assumed that the first edit event information includes information indicating a change in size and position of a specific image object, as information indicating the edit content of the first edit processing. In such a case, based on the first edit event information, the first edit processing unit 13E edits the size and position of the image object to be subjected to the first edit processing. In addition, the first edit processing unit 13E similarly edits the size and position of the special color object generated so as to be superimposed on the image object.

Therefore, when a special color object is superimposed on an image object, the first edit processing unit 13E performs the first edit processing designated for the image object on the image object and the special color object superimposed on the image object.

Note that a special color object may not be yet layered on an image object to be subjected to the first edit processing, which is indicated by the first edit event information. In such a case, the first edit processing unit 13E can perform the designated first edit processing only on the image object to be subjected to the first edit processing, based on the first edit event information.

Further, it is assumed that the first edit event information includes information indicating deletion of an image object as information indicating the edit content of the first edit processing. In such a case, based on the first edit event information, the first edit processing unit 13E can delete both the image object to be subjected to the first edit processing and the special color object superimposed on the image object. In addition, at this time, the first edit processing unit 13E can delete the common identification information included in the image management information attached to the deleted image object, from the management table 15B.

Next, the third identification unit 13F and the second edit processing unit 13G are described.

The third identification unit 13F receives notification of the second edit event information from the operation control unit 11. Upon receiving the notification of the second edit event information, the third identification unit 13F identifies all special color objects (additional objects) included in the original data.

For example, the third identification unit 13F identifies all special color objects to which the additional tag information (see FIG. 5) is added in the original data to identify all the special color objects included in the original data.

The second edit processing unit 13G collectively performs the second edit processing designated by the second edit-processing designation unit 11E on all the special color objects identified by the third identification unit 13F.

Therefore, the second edit processing unit 13G can collectively perform the designated second edit processing on all the special color objects included in the original data.

Next, the deletion processing unit 13H is described. The deletion processing unit 13H receives the notification of the special-color deletion event information from the operation control unit 11. Upon receiving the special-color deletion event information, the deletion processing unit 13H identifies a special color object to be deleted from among the special color objects included in the original data. The deletion processing unit 13H deletes the designated special color object to be deleted, the additional management information identifying the specific color object, and the image management information identifying the image object on which the additional object has been superimposed.

Specifically, the deletion processing unit 13H deletes, from the original data, the special color object to be deleted, the additional management information added to the specific color object, and the image management information identifying the image object on which the additional object is superimposed. The deletion processing unit 13H deletes, from the management table 15B, the common identification information included in the deleted additional management information and the deleted image management information.

FIGS. 14A to 14D are schematic diagrams of an example of the transition of the object configuration and the data structure of the management table 15B when the special color object is deleted.

Figure 14A:
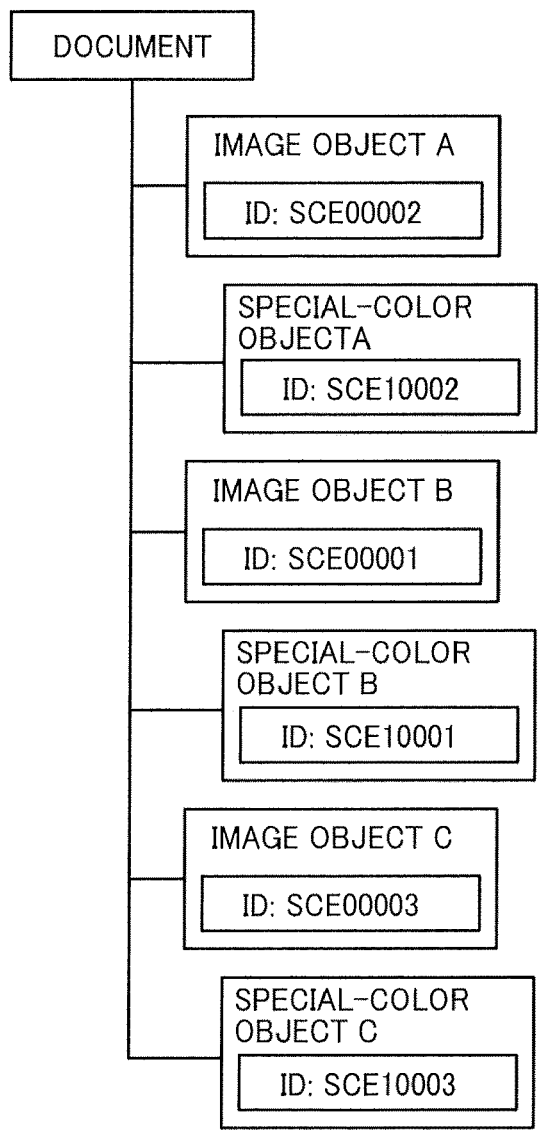
FIGS. 14A to 14D are schematic diagrams of an example of the transition of object configuration and data structure of a management table.
Figure 14B:
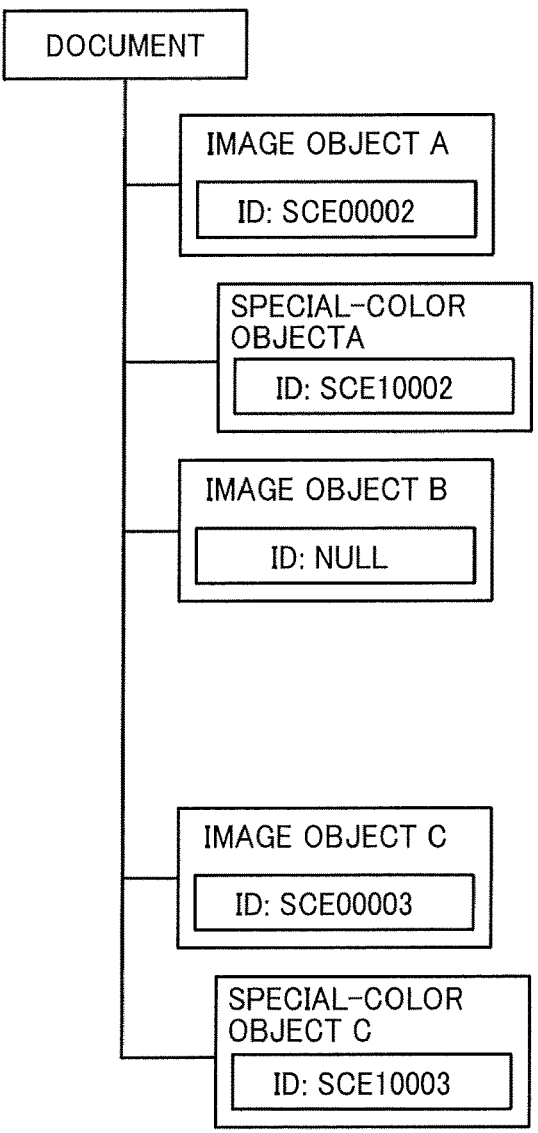
Figure 14C:
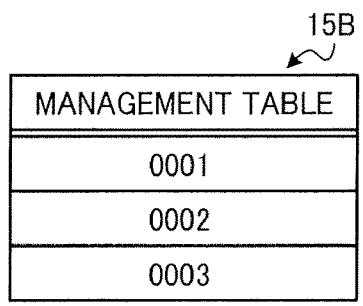

For example, as illustrated in FIG. 14A, it is assumed that image data A to C are included in the original data. Further, it is assumed that the special color objects A to C are generated and superimposed on the image objects A to C, respectively, by the processing of the generation unit 13C and the management unit 13D, and additional management information and image management information are added. Further, as illustrated in FIG. 14C, it is assumed that, in the management table 15B, common identification information ("0001", "0002", and "0003") common to each pair of the image object A and the special color object A, the image object B and the special color object B, and the image object C and the special color object C is registered by the management unit 13D.

Then, it is assumed that deletion of the special color object B is designated by a user's operation instruction. The deletion processing unit 13H deletes, from the original data, the designated special color object B to be deleted, the additional management information "SCE 10001" identifying the specific color object, the image management information "SCE00001" identifying the image object on which the additional object is superimposed (see FIG. 14B). Accordingly, as illustrated in FIG. 14B, the image management information "SCE00001" added to the image object B is deleted, and the special color object B and the special color management information "SCE 10001" added to the special color object B are deleted from the original data.

Figure 14D:
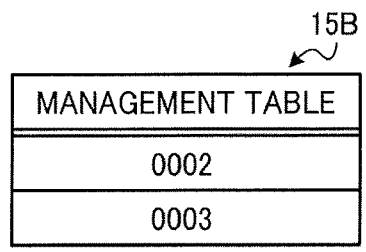

Further, the deletion processing unit 13H deletes, from the management table 15B, the common identification information "0001" included in the special color management information "SCE 10001" added to the deleted special color object B (see FIG. 14D).

Therefore, when deleting the special color object from the original data, the deletion processing unit 13H can delete, from the original data and the management table 15B, the special color management information added to the specific color object, the image management information added to the image object on which the special color object is superimposed, and the common identification information common to the special color management information and the image management information, in addition to the specific color object to be deleted.

Figure 15:
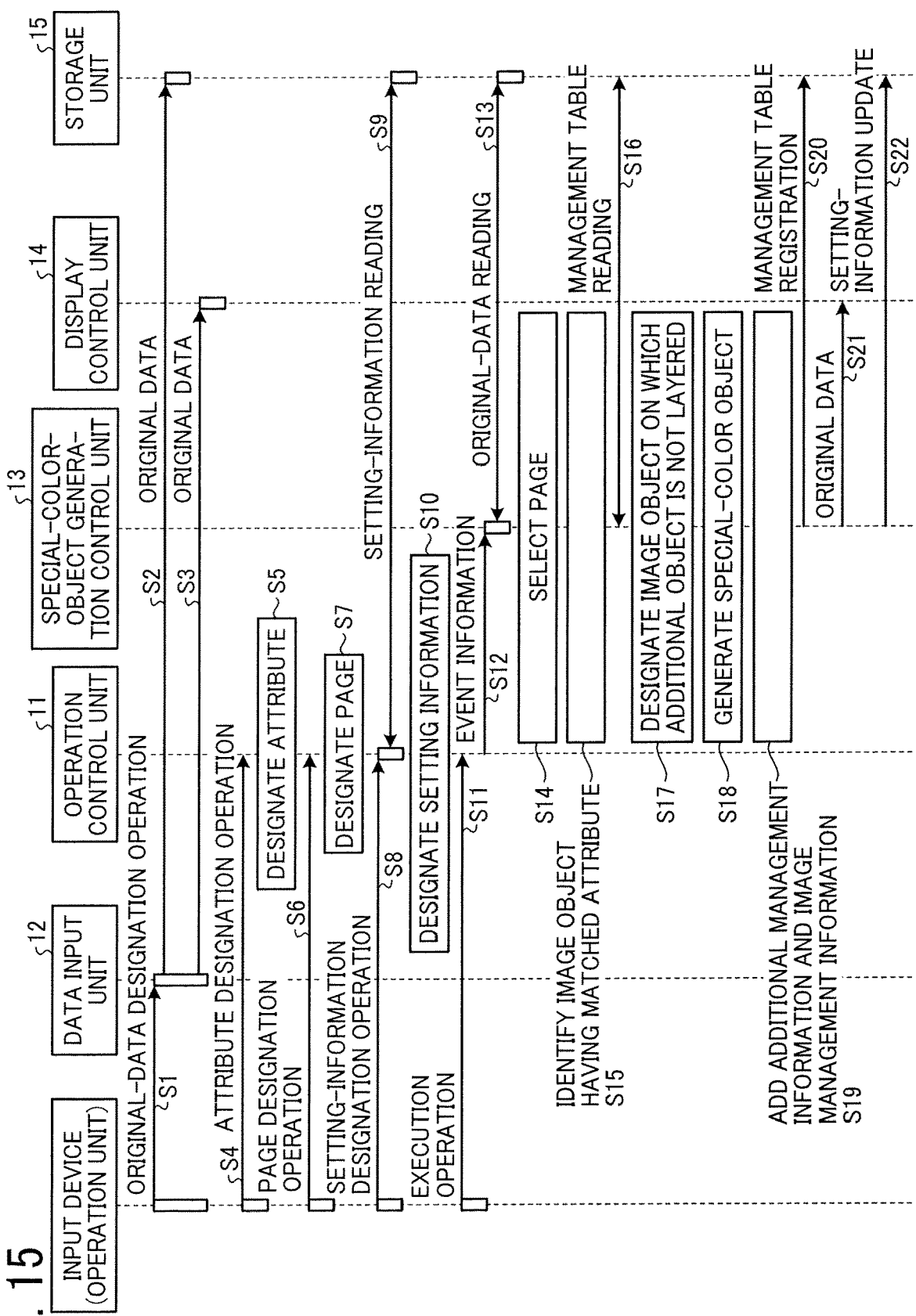
FIG. 15 is a sequence diagram of an example of a procedure of special-color-object generation processing.

Next, an example of a procedure of information processing executed by the information processing apparatus 10 is described. FIG. 15 is a sequence diagram of an example of the procedure of special-color-object generation processing executed by the information processing apparatus 10. FIG. 15 illustrates a case in which no special color object is generated on original data in a state before the processing of step S1.

First, the data input unit 12 receives an operation of designating original data via an input device (operation unit), such as the keyboard 100 (step S1). The data input unit 12 reads the original data designated in step S1 from a memory, and records the read original data in the storage unit 15 (step S2). The data input unit 12 converts the original data read in step S1 into preview display data in a data format that can be handled by the display control unit 14, and causes the display control unit 14 to display a preview image (step S3).

Next, the operation control unit 11 (the attribute designation unit 11A) receives, via the UI, an operation for designating an attribute of a target image object on which a special color object is to be superimposed (step S4). The attribute designation unit 11A of the operation control unit 11 designates an attribute corresponding to the received operation (step S5).

Next, the operation control unit 11 (the page designation unit 11B) receives, via the UI, an operation for designating a page to be processed for generating a special color object (step S6). The page designation unit 11B of the operation control unit 11 designates a page corresponding to the received operation (step S7).

Next, the operation control unit 11 (the setting-information designation unit 11C) receives an operation for designating the setting information via the UI (step S8). The operation control unit 11 reads the setting information for achieving the gloss effect corresponding to the setting button pressed by the user from the storage unit 15 (step S9). The setting-information designation unit 11C of the operation control unit 11 designates the read setting information (step S10).

Next, the operation control unit 11 receives an operation instructing the execution of generation of a special color object via the UI (step S11). The operation control unit 11 generates event information and notifies the special-color-object generation control unit 13 of the event information (step S12). As described above, the event information includes, e.g., information instructing generation of a special color object, information indicating the attribute designated in step S5, information indicating the page designated in step S7, and the setting information designated in step S10.

Upon receiving the notification of the event information from the operation control unit 11, the special-color-object generation control unit 13 (the first identification unit 13A) reads the original data from the storage unit 15 (step S13) The first identification unit 13A of the special-color-object generation control unit 13 selects the page designated in step S7 from a plurality of pages constituting the original data read in step S13 (step S14).

Next, the first identification unit 13A of the special-color-object generation control unit 13 identifies all image objects indicating the attribute designated in step S5 from the plurality of image objects included in the page selected in step S14 (step S15).

Next, the second identification unit 13B of the special-color-object generation control unit 13 reads the management table 15B from the storage unit 15 (step S16) and identifies the image object not yet layered with a special color object (step S17).

Next, the generation unit 13C of the special-color-object generation control unit 13 uses the setting information designated in step S10 for each image object designated in step S17 to generate a special color object, having the same shape as the image object, to be placed just above the image object (step S18).

Next, the management unit 13D adds the additional management information to the special color object generated in step S18 and embeds the additional management information in the original data (step S19). In step S19, the management unit 13D adds the image management information to the image object on which the special color object generated in step S18 is superimposed, and embeds the image management information in the original data.

Next, the management unit 13D registers the common identification information, which is included in the additional management information added to the special color object and the image management information added to the image object in step S19, in the management table 15B of the storage unit 15 (step S20).

Next, the special-color-object generation control unit 13 controls the display control unit 14 to display the original data to which the special color object has been added by the processing of step S18 (step S21). In addition, in the processing of step S21, the special-color-object generation control unit 13 performs control to store the original data in the storage unit 15.

Next, the special-color-object generation control unit 13 performs control to store, in the storage unit 15, the setting information used for generating the special color object in step S18 (step S22). Then, this sequence is ended.

Figure 16:
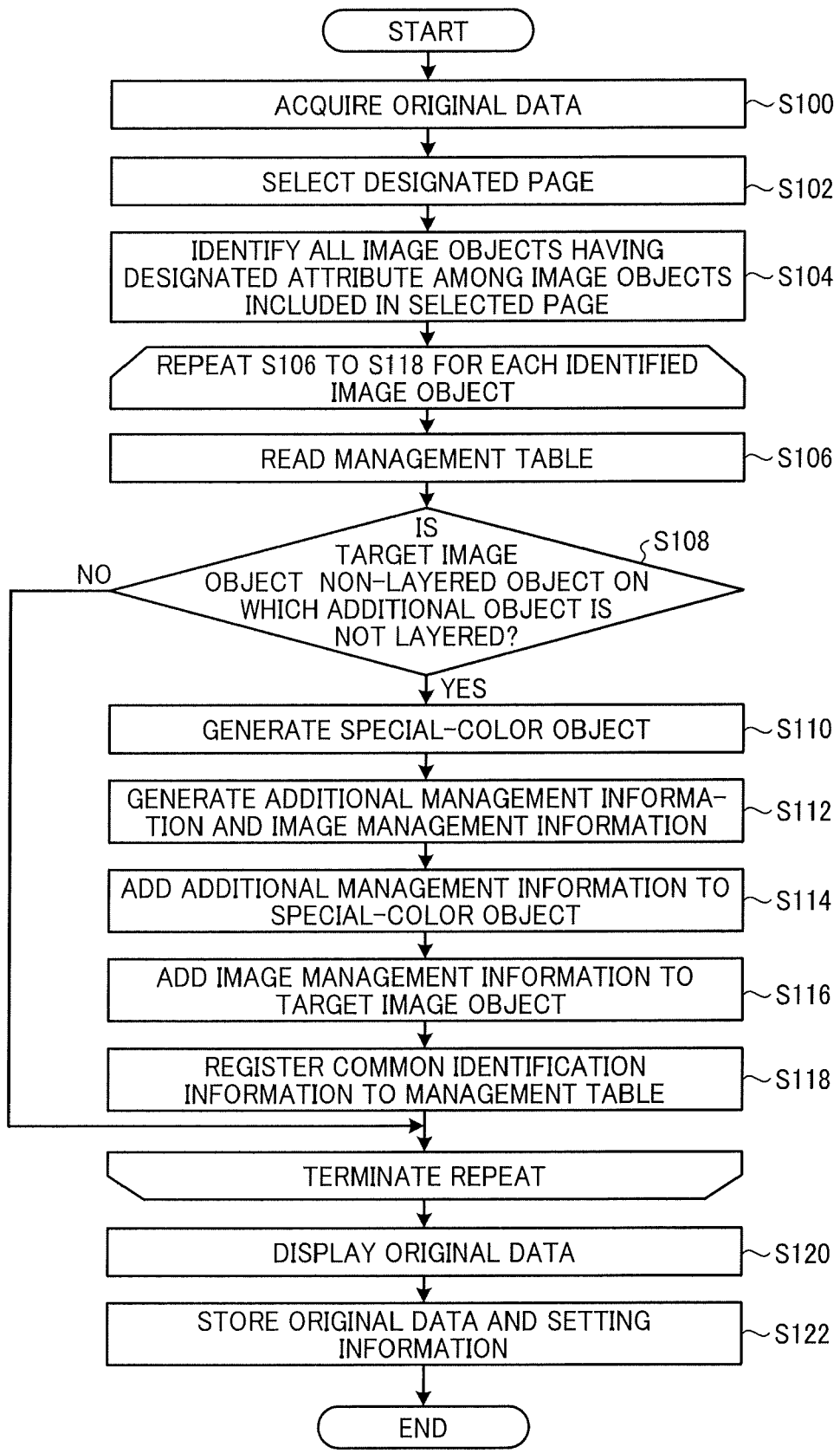
FIG. 16 is a flowchart of an example of the procedure of the special-color-object generation processing.

FIG. 16 is a flowchart of an example of the procedure of the special-color-object generation processing executed by the special-color-object generation control unit 13.

First, the first identification unit 13A acquires original data from the storage unit 15 (step S100) Next, the first identification unit 13A selects a page designated in the event information notified from the operation control unit 11 from a plurality of pages constituting the original data acquired in step S100 (step S102).

Next, in step S104, the first identification unit 13A identifies all image objects indicating the attributes designated by the attribute designation unit 11A from among the image objects included in the page selected in step S102.

Next, the special-color-object generation control unit 13 executes the processing of steps S106 to S118 for each image object identified in step S104.

In step S106, first, the second identification unit 13B reads the management table 15B from the storage unit 15 (step S106).

Next, the second identification unit 13B determines whether an additional object is not yet layered on the image object identified in step S104 that is a target to be processed (step S108).

If the second identification unit 13B determines that a special color object has been layered on the image object (NO in step S108), the processing of steps S106 to S118 for the image object to be processed is not performed. When the second identification unit 13B determines that the special color object is not layered (YES in step S108), the process proceeds to step S110.

In step S110, the generation unit 13C uses the setting information designated by the setting-information designation unit 11C on the image object to be processed, to generate a special color object, having the same shape as the image object, to be placed just above the image object (step S110).

Next, the management unit 13D generates additional management information to be added to the special color object generated in step S110. The management unit 13D also generates image management information to be added to the image object to be processed, on which the specific color object has been generated (step S112).

As described above, the management unit 13D uses common identification information of the same value for the pair of the additional management information and the image management information. The additional management information further includes an application ID "SCE" and "1" indicating "child" flag as additional flag information. The image management information further includes application ID "SCE" and "0" indicating "parent" flag as image flag information.

Next, the management unit 13D adds the additional management information generated in step S112 to the special color object generated in step S110, and embeds the additional management information in the original data acquired in step S100 (step S114).

Next, the management unit 13D adds the image management information generated in step S112 to the image object to be processed, on which the specific color object has been generated, and embeds the image management information in the original data acquired in step S100 (step S116).

Next, the management unit 13D registers the common identification information included in the additional management information and the image management information generated in step S112, in the management table 15B of the storage unit 15 (step S118).

When the processing of steps S106 to S118 is executed on all the image objects identified in step S104, the process proceeds to step S120.

In step S120, the special-color-object generation control unit 13 controls the display control unit 14 to display the original data to which the special color object has been added by the processing of steps S102 to S118 (step S120).

Next, the special-color-object generation control unit 13 performs control to store, in the storage unit 15, the original data displayed in step S120 and the setting information used for generating the special color object in step S110 (step S122). Then, this routine is terminated.

Figure 17:
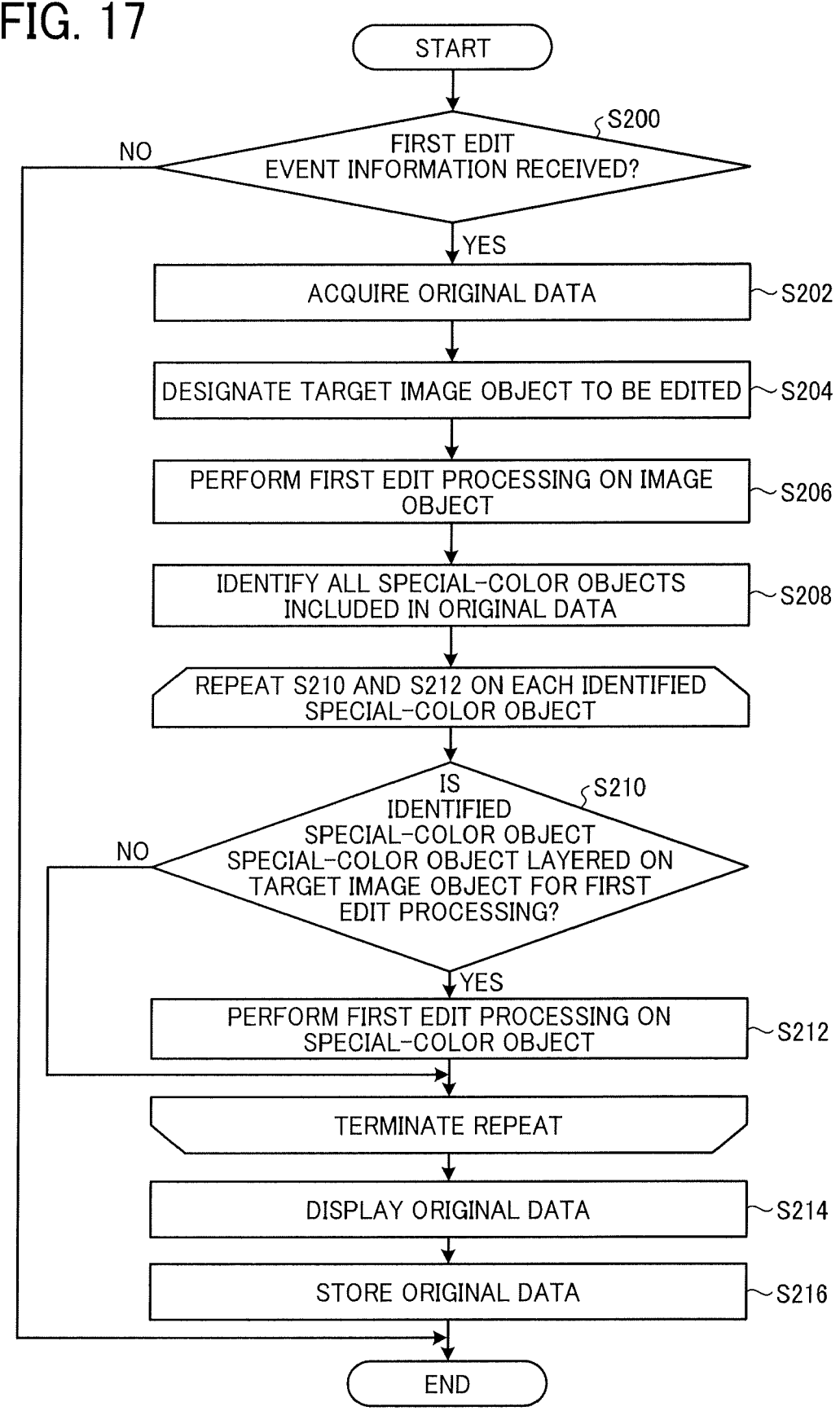
FIG. 17 is a flowchart of an example of a procedure of first edit processing.

Next, the procedure of the first edit processing executed when the special-color-object generation control unit 13 receives the notification of the first edit event information is described. FIG. 17 is a flowchart of an example of the procedure of the first edit processing.

First, the first edit processing unit 13E determines whether notification of the first edit event information has been received from the operation control unit 11 (step S200). If a negative determination is made in step S200 (NO in step S200), this routine is terminated. If an affirmative determination is made in step S200 (YES in step S200), the process proceeds to step S202.

In step S202, the first edit processing unit 13E acquires the original data to be edited from the storage unit 15 (step S202).

Next, the first edit processing unit 13E identifies the image object to be edited included in the original data acquired in step S202 (step S204). For example, the first edit processing unit 13E retrieves, from the original data, the image object to be subjected to the first edit processing, which is indicated by the first edit event information acquired in step S200. Specifically, the image object identified by the identification information, included in the first edit event information, identifying the target of the first edit processing is retrieved from the original data.

Next, the first edit processing unit 13E performs the first edit processing on the image object identified in step S204 (step S206). In step S206, the first edit processing unit 13E performs, on the image object, the first edit processing indicated in the first edit event information received in step S200.

Next, the first edit processing unit 13E identifies all special color objects included in the original data acquired in step S202 (step S208). The first edit processing unit 13E identifies additional tag information included in the original data to identify the special color object.

The first edit processing unit 13E executes the processing of steps S210 to S212 for each special color object identified in step S208.

First, the first edit processing unit 13E determines whether the identified special color object is a special color object that has been superimposed on the image object to be subjected to the first edit processing (step S210). For example, the first edit processing unit 13E reads the image management information included in the image object that has been subjected to the first edit processing in step S206. The first edit processing unit 13E identifies common identification information included in the read image management information. The first edit processing unit 13E determines whether additional management information including the identified common identification information is added to the identified special color object. If the first edit processing unit 13E determines that the additional management information is added, an affirmative determination may be made in step S210.

When the special color object is not layered on the image object on which the first edit processing has been performed in step S206, the first edit processing unit 13E may omit the processing of steps S208 to S212. Determination of whether the special color object is not yet layered on the image object may be made in the same manner as in step S108 (see FIG. 16).

When a negative determination is made in step S210 (NO in step S210), the processing of step S212 is not performed on the special color object to be processed. If an affirmative determination is made in step S210 (YES in step S210), the process proceeds to step S212. In step S212, the first edit processing unit 13E performs the same first edit processing as in step S206 on the specified special color object. Then, the process proceeds to step S214.

When the processing of steps S210 to S212 is executed for all of the special color objects identified in step S208, the process proceeds to step S214. In step S214, the special-color-object generation control unit 13 controls the display control unit 14 to display the original data that has been subjected to the first edit processing by the processes of steps S200 to S212 (step S214).

Next, the special-color-object generation control unit 13 performs control to store the original data displayed in step S214 in the storage unit 15 (step S216). Then, this routine is terminated.

Figure 18:
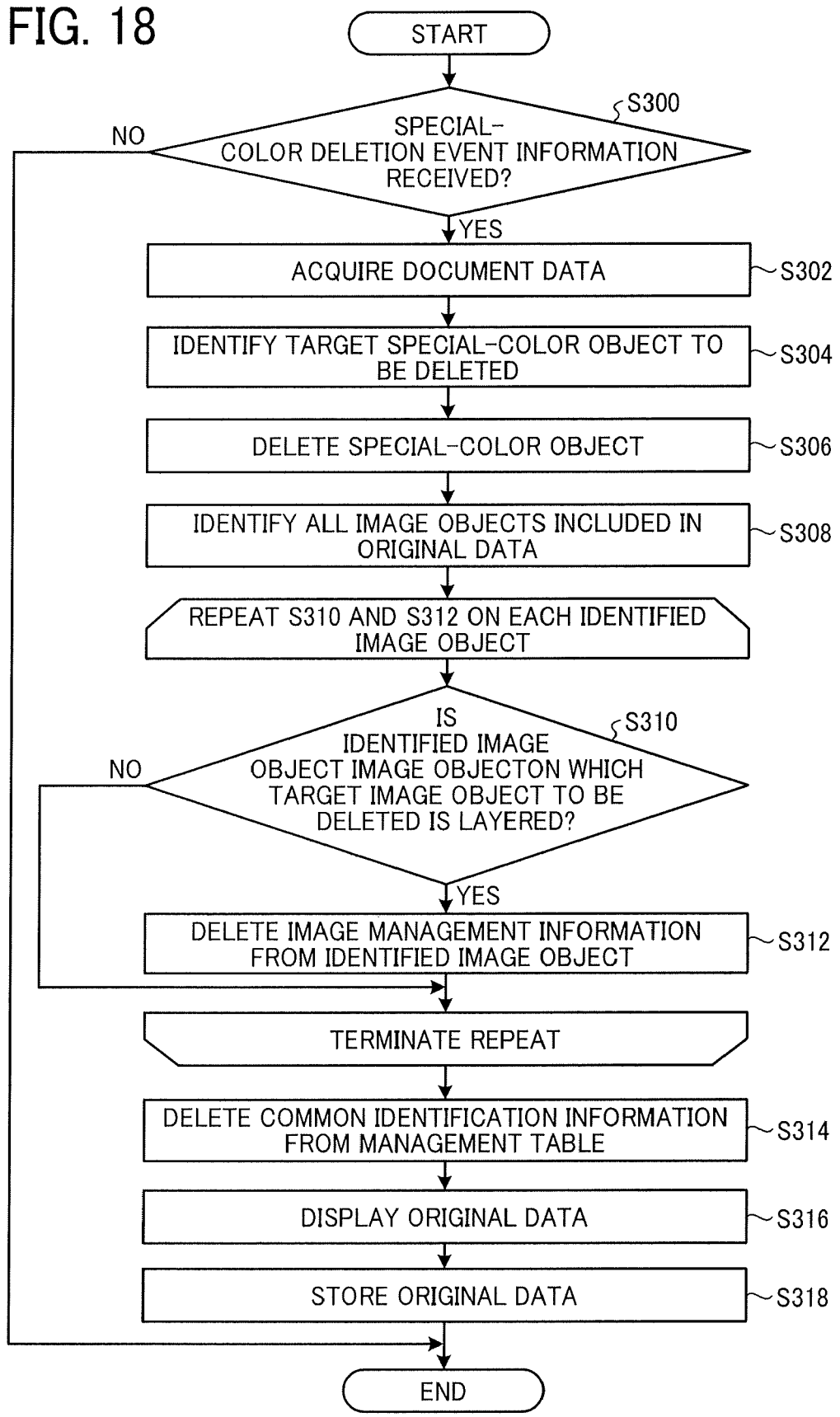
FIG. 18 is a flowchart of an example of a procedure of deletion processing.

Next, the procedure of deletion processing executed when the special-color-object generation control unit 13 receives notification of special-color deletion event information is described. FIG. 18 is a flowchart of an example of the procedure of the deletion processing.

First, the deletion processing unit 13H determines whether notification of special-color deletion event information is received from the operation control unit 11 (step S300). If a negative determination is made in step S300 (NO in step S300), this routine is terminated. If an affirmative determination is made in step S300 (YES in step S300), the process proceeds to step S302.

In step S302, the deletion processing unit 13H acquires original data from the storage unit 15 (step S302).

Next, the deletion processing unit 13H identifies an additional object to be deleted included in the original data acquired in step S302 (step S304). For example, the deletion processing unit 13H retrieves, from the original data, the additional object to be deleted, which is indicated by the special-color deletion event information acquired in step S300. Specifically, the special color object identified by the identification information, included in the special-color deletion event information, identifying the deletion target is retrieved from the original data.

Next, the deletion processing unit 13H deletes the special color object to be deleted identified in step S304 from the original data acquired in step S302 (step S306).

Next, the deletion processing unit 13H identifies all image objects included in the original data acquired in step S300 (step S308).

The deletion processing unit 13H executes the processing of steps S310 to S312 for each image object identified in step S308.

First, the deletion processing unit 13H determines whether the identified image object is an image object on which the special color object to be deleted has been superimposed, which is indicated by the special-color deletion event information received in step S300 (step S310). For example, the deletion processing unit 13H reads the additional management information that has been added to the special color object deleted in step S306. Note that the deletion processing unit 13H may read the additional management information before deleting the specific color object. The deletion processing unit 13H identifies common identification information included in the read additional management information. The deletion processing unit 13H determines whether image management information including the identified common identification information is added to the identified image object. If the deletion processing unit 13H determines that the image management information is added, an affirmative determination may be made in step S310.

If a negative determination is made in step S310 (NO in step S310), the processing of step S312 is not performed on the image object to be processed. If an affirmative determination is made in step S310 (YES in step S310), the process proceeds to step S312. In step S312, the deletion processing unit 13H deletes the image management information added to the identified image object (step S312). That is, when the image management information is embedded in the image object, the deletion processing unit 13H deletes the image management information from the image object. Then, the process proceeds to step S314.

In step S314, the deletion processing unit 13H deletes, from the management table 15B, the common identification information included in the additional management information that has been added to the special color object deleted in step S306 (step S314).

Next, the special-color-object generation control unit 13 controls the display control unit 14 to display the original data that has been subjected to the deletion processing by the processing of step S300 to step S314 (step S316).

Next, the special-color-object generation control unit 13 performs control to store the original data displayed in step S316 in the storage unit 15 (step S318). Then, this routine is terminated.

As described above, the information processing apparatus 10 according to the present embodiment includes the attribute designation unit 11A, the first identification unit 13A, the second identification unit 13B, and the generation unit 13C. The attribute designation unit 11A designates the attribute of an image object to be superimposed with an additional object. The first identification unit 13A identifies an image object indicating the designated attribute, from among image objects included in original data (image data). The second identification unit 13B identifies an image object not yet layered with a special color object (additional object) from among image objects identified by the first identification unit 13A. The generation unit 13C generates an additional object to be superimposed on the image object identified by the second identification unit 13B.

As described above, in the information processing apparatus 10 according to the present embodiment, the generation unit 13C generates a special color object (additional object) for the image object not yet layered with the special color object, which indicates the attribute designated by the attribute designation unit 11A, so that the special color object is superimposed on the image object.

Therefore, in the present embodiment, the generation unit 13C does not generate a further special color object for an image object on which a special color object has already been superimposed. The generation unit 13C generates a special color object so as to be superimposed only on an image object not yet layered with a special color object.

Therefore, the information processing apparatus 10 according to the present embodiment can generate an additional object according to the intention of the user.

According to the present embodiment, since it is suppressed that a plurality of special color objects are generated so as to be superimposed one on another, it is possible to suppress an increase in the data size of the original data in addition to the above-described effect.

The management unit 13D associates additional management information identifying a special color object (additional object) with image management information identifying an image object on which the specific color object (additional object) has been superimposed, to manage the additional management information and the image management information in one-to-one correspondence with each other. The second identification unit 13B identifies an image object identified by the image management information that is not associated with the additional management information, among the identified image objects, as the image object not yet layered with a special color object (additional object).

Therefore, the information processing apparatus 10 according to the present embodiment has an effect of facilitating identification of an image object on which an additional object is not yet layered, in addition to the above-described effects.

The management unit 13D adds, to the generated additional object, additional management information including common identification information common to the image object on which the additional object has been superimposed and the additional object and additional flag information indicating whether the object is an additional object. The management unit 13D also adds image management information including the common identification information and image flag information indicating whether the object is an image object, to the image object on which the generated additional object has been superimposed.

Therefore, the information processing apparatus 10 according to the present embodiment has an effect of facilitating identification of an image object on which an additional object is not yet layered, in addition to the above-described effects. For example, even when the original data is PDF data, it is possible to easily identify the image object not yet layered with an additional object.

The management unit 13D stores the common identification information in the storage unit 15.

The management unit 13D associates the additional management information with the image management information and stores the additional management information and the image management information in one-to-one correspondence in the storage unit 15.

The information processing apparatus 10 includes the first edit-processing designation unit 11D (edit-processing designation unit) and the first edit processing unit 13E (edit processing unit). The first edit-processing designation unit 11D designates the first edit processing (edit processing) of the image object. The first edit processing unit 13E performs the designated first edit processing (edit processing) on the image object and the special color object (additional object) superimposed on the image object.

As described above, in the present embodiment, when the first edit processing on the image object is designated, the first edit processing unit 13E performs the first edit processing designated for the image object on both the image object and the special color object having been superimposed on the image object. Therefore, in addition to the above-described effects, the information processing apparatus 10 can enhance work efficiency.

The information processing apparatus 10 includes the deletion designation unit 11F and the deletion processing unit 13H. The deletion designation unit 11F designates the special color object (additional object) to be deleted. The deletion processing unit 13H deletes the designated special color object (additional object) to be deleted, the additional management information identifying the specific color object (additional object), and the image management information identifying the image object on which the special color object (additional object) has been superimposed.

As described above, in the information processing apparatus 10 according to the present embodiment, the deletion processing unit 13H deletes the designated special color object to be deleted, the additional management information identifying the specific color object, and the image management information identifying the image object on which the additional object has been superimposed. Therefore, in addition to the above-described effects, the information processing apparatus 10 can enhance work efficiency.

Note that the additional object is a special color object represented by a special color.

The additional object is represented by a special color, and the special color represents any one of metallic color, white, transparent, and fluorescent.

The information processing method according to the present embodiment includes a designation step of designating an attribute of an image object to be superimposed with an additional object, a first identification step of identifying an image object indicating a designated attribute from image objects included in image data, a second identification step of identifying an image object not yet layered with an additional object out of image objects identified by the first identification step, and a generation step of generating an additional object superimposed on the image object identified by the second identification step.

A non-transitory recording medium stores program code to cause one or more processor to execute the information processing method according to the present embodiment. The information processing method includes a designation step of designating an attribute of an image object to be superimposed with an additional object, a first identification step of identifying an image object indicating a designated attribute from image objects included in image data, a second identification step of identifying an image object not yet layered with an additional object out of image objects identified by the first identification step, and a generation step of generating an additional object superimposed on the image object identified by the second identification step.

Although some embodiments of the present disclosure have been described above, the above-described embodiments are presented as examples and are not intended to limit the scope of the present invention. The present invention is not limited to the above-described embodiments as they are, and constituent elements can be modified and embodied in the practical stage without departing from the gist thereof. Further, various modifications and variations can be formed by appropriately combining a plurality of constituent elements disclosed in the above-described embodiments. For example, some constituent elements may be deleted from all the constituent elements described in the above-described embodiments.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An information processing apparatus comprising circuitry to:
designate an attribute of an image object to be superimposed with an additional object;
perform, on image data, a first identification to identify image objects indicating the attribute which has been designated;
perform, on the image objects identified by the first identification, a second identification to identify an image object that has not yet been superimposed with the additional object; and
generate the additional object to be superimposed on the image object identified by the second identification,
wherein the circuitry;
associates additional management information identifying the additional object with image management information identifying an image object that has been superimposed with the additional object, to manage the additional management information and the image management information in a one-to-one correspondence, and
identifies, on image objects identified by the first identification, an image object identified by the image management information not associated with the additional management information as the image object that has not been superimposed with the additional object.

2. The information processing apparatus according to claim 1,
wherein the circuitry adds the additional management information to the additional object generated, the additional management information including common identification information common to the additional object and the image object that has been superimposed with the additional object and additional flag information indicative of being the additional object, and
adds the image management information to the image object that has been superimposed with the additional object generated, the image management information including the common identification information and image flag information indicative of being the image object.

3. The information processing apparatus according to claim 2,
wherein the circuitry stores the common identification information in a memory.

4. The information processing apparatus according to claim 1,
wherein the circuitry associates the additional management information and the image management information in the one-to-one correspondence, to store the additional management information and the image management information in a memory.

5. The information processing apparatus according to claim 1,
wherein the circuitry designates an additional object to be deleted, and deletes the additional object designated to be deleted, the additional management information identifying the additional object designated to be deleted, and the image management information identifying the image object that has been superimposed with the additional object designated to be deleted.

6. The information processing apparatus according to claim 5,
wherein the circuitry designates edit processing of an image object, and performs the edit processing on the image object and an additional object that has been superimposed on the image object.

7. The information processing apparatus according to claim 1,
wherein the image data is PDF format data.

8. The information processing apparatus according to claim 1,
wherein the additional object is a special color object represented by a special color.

9. The information processing apparatus according to claim 1,
wherein the additional object is represented by a special color, and the special color indicates any one of a metallic color, white, transparent, and fluorescent.

10. An information processing method comprising:
designating an attribute of an image object to be superimposed with an additional object;
performing, on image data, a first identification to identify image objects indicating the attribute which has been designated;
performing on the image objects identified by the first identification, a second identification to identify an image object that has not yet been superimposed with the additional object; and
generating the additional object to be superimposed on the image object identified by the second identification,
wherein the method further comprises:
associating additional management information identifying the additional object with image management information identifying an image object that has been superimposed with the additional object, to manage the additional management information and the image management information in a one-to-one correspondence; and
identifying, on image objects identified by the first identification, an image object identified by the image management information not associated with the additional management information as the image object that has not been superimposed with the additional object.

11. A non-transitory recording medium storing program code to, when executed by one or more processors, cause the one or more processors to execute a method comprising:
performing, on image data a first identification to identify image objects indicating the attribute which has been designated;
performing, on the image objects identified by the first identification, a second identification to identify an image object that has not yet been superimposed with the additional object; and
generating the additional object to be superimposed on the image object identified by the second identification,
wherein the method further comprises:
associating additional management information identifying the additional object with image management information identifying an image object that has been superimposed with the additional object, to manage the additional management information and the image management information in a one-to-one correspondence; and
identifying, on image objects identified by the first identification, an image object identified by the image management information not associated with the additional management information as the image object that has not been superimposed with the additional object.

12. The method according to claim 10, further comprising:
associating the additional management information and the image management information in the one-to-one correspondence, to store the additional management information and the image management information in a memory.

13. The method according to claim 10, further comprising:
designating an additional object to be deleted, and deletes the additional object designated to be deleted, the additional management information identifying the additional object designated to be deleted, and the image management information identifying the image object that has been superimposed with the additional object designated to be deleted.

14. The method according to claim 13, further comprising:
designating edit processing of an image object, and performing the edit processing on the image object and an additional object that has been superimposed on the image object.

15. The non-transitory recording medium according to claim 11, wherein the method further comprises:
associating the additional management information and the image management information in the one-to-one correspondence, to store the additional management information and the image management information in a memory.

16. The non-transitory recording medium according to claim 11, wherein the method further comprises:
designating an additional object to be deleted, and deletes the additional object designated to be deleted, the additional management information identifying the additional object designated to be deleted, and the image management information identifying the image object that has been superimposed with the additional object designated to be deleted.

17. The non-transitory recording medium according to claim 16, wherein the method further comprises:
designating edit processing of an image object, and performing the edit processing on the image object and an additional object that has been superimposed on the image object.

* * * * *